United States Patent [19]

Takagi et al.

[11] 4,348,704

[45] Sep. 7, 1982

[54] MAGNETIC TAPE RECORDING/REPRODUCING APPARATUS

[75] Inventors: Satoshi Takagi; Toshio Watanabe, both of Toda, Japan

[73] Assignee: Clarion Co., Ltd., Tokyo, Japan

[21] Appl. No.: 25,740

[22] Filed: Mar. 21, 1979

[30] Foreign Application Priority Data

| Mar. 24, 1978 | [JP] | Japan | 53-32920 |
| Mar. 28, 1978 | [JP] | Japan | 53-34800 |
| Mar. 29, 1978 | [JP] | Japan | 53-35331 |
| Mar. 31, 1978 | [JP] | Japan | 53-36705 |
| Mar. 31, 1978 | [JP] | Japan | 53-40988 |
| Mar. 31, 1978 | [JP] | Japan | 53-40989 |

[51] Int. Cl.³ .............. G11B 15/32; G11B 15/04; G11B 15/10; G11B 15/02
[52] U.S. Cl. .............. 360/96.5; 360/96.4; 360/105; 360/60; 360/137
[58] Field of Search .............. 360/96.5, 96.6, 105, 360/137, 96.3, 60, 96.2–96.4

[56] References Cited

U.S. PATENT DOCUMENTS

| 3,947,884 | 3/1976 | Yokota et al. | 360/96.6 |
| 3,987,486 | 10/1976 | Ito et al. | 360/96.5 |
| 4,071,859 | 1/1978 | Sami | 360/96.5 |
| 4,106,064 | 8/1978 | Hoshido | 360/60 |

Primary Examiner—Robert S. Tupper
Attorney, Agent, or Firm—Wallenstein, Wagner, Hattis, Strampel & Aubel

[57] ABSTRACT

A magnetic tape recording/reproducing apparatus with a tape pack loading mechanism including a slide plate operable upon insertion of a tape pack and means interlocked with the slide plate to feed the tape pack into a recording/reproducing position, which is characterized by a swaying member interlocked with the slide plate; a floating member having an intermediate portion abutting against an operating portion of the swaying member and having projections at opposite ends thereof; engaging members disposed in relation to the projections of the floating member, respectively; the projections being adapted to engage with or disengage from the engaging members, respectively, to changeover the pivotal points of the floating member; and a lock member for locking the slide plate and a slide frame interlocked with the slide plate and an ejecting mechanism, through the floating member.

9 Claims, 23 Drawing Figures

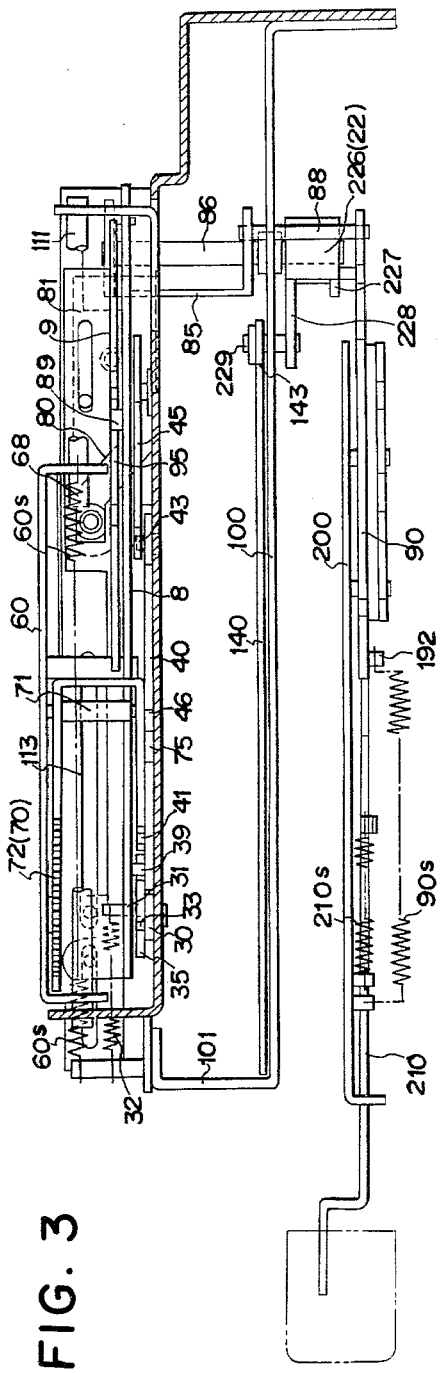
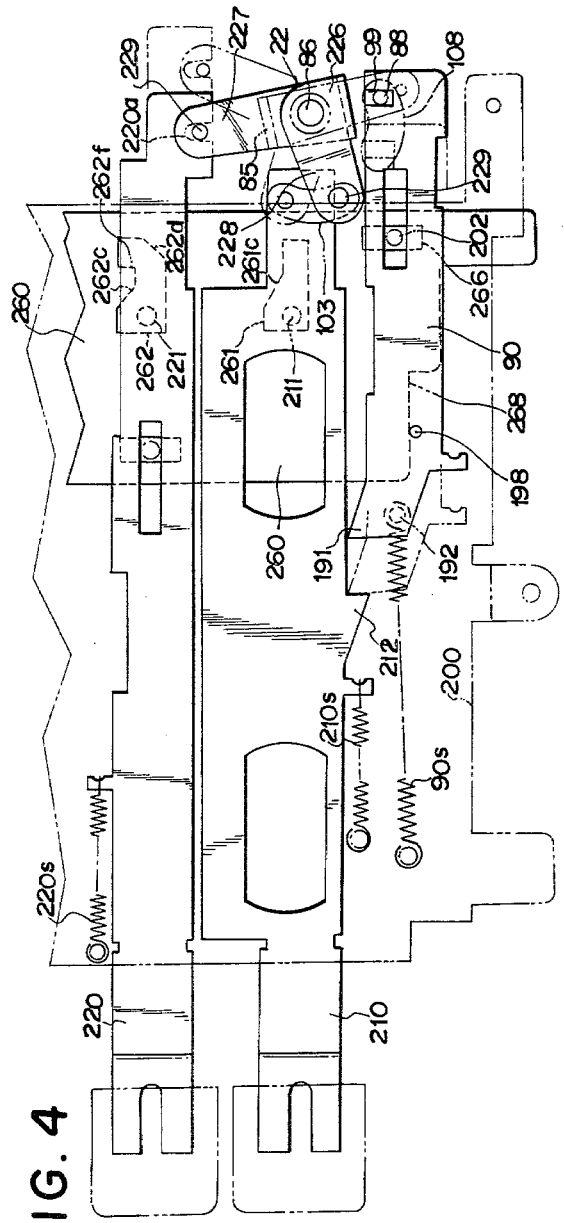
FIG. 3
FIG. 4

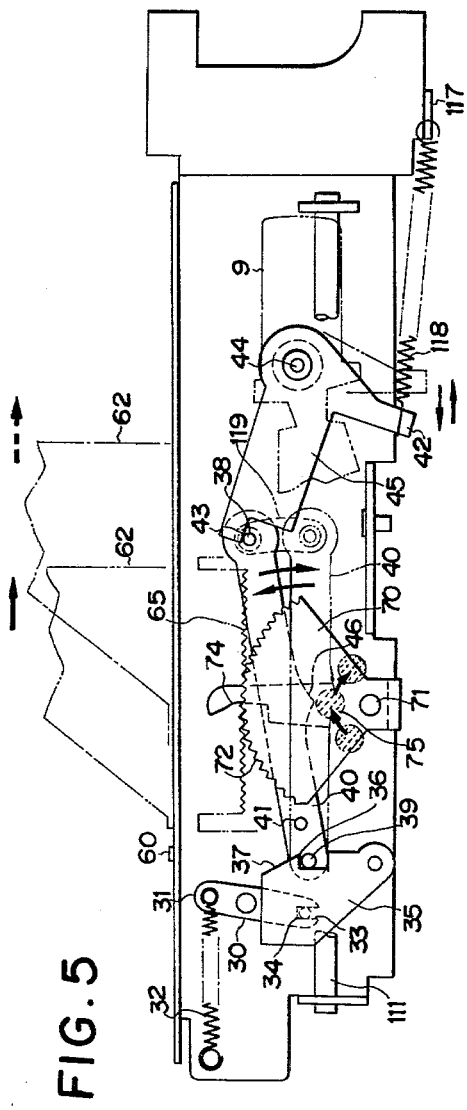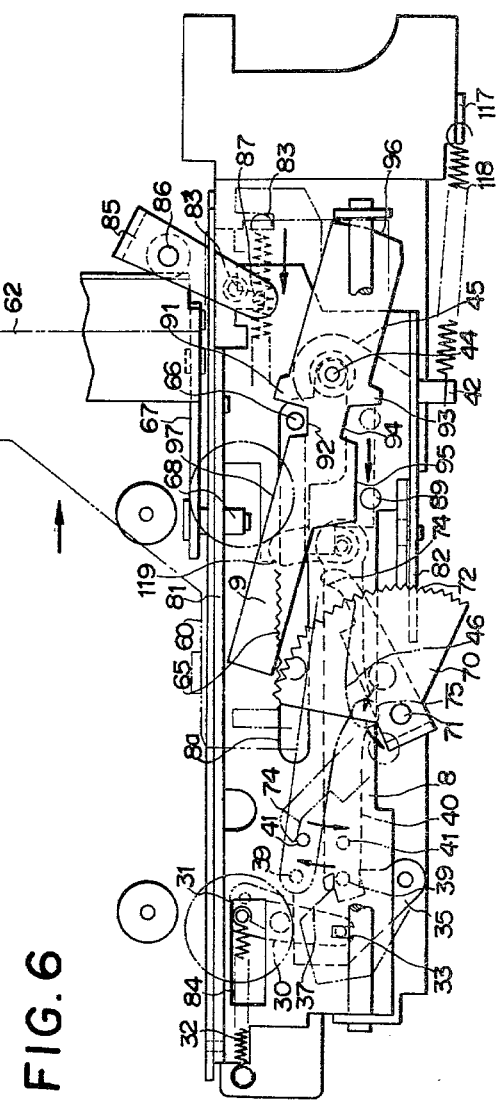

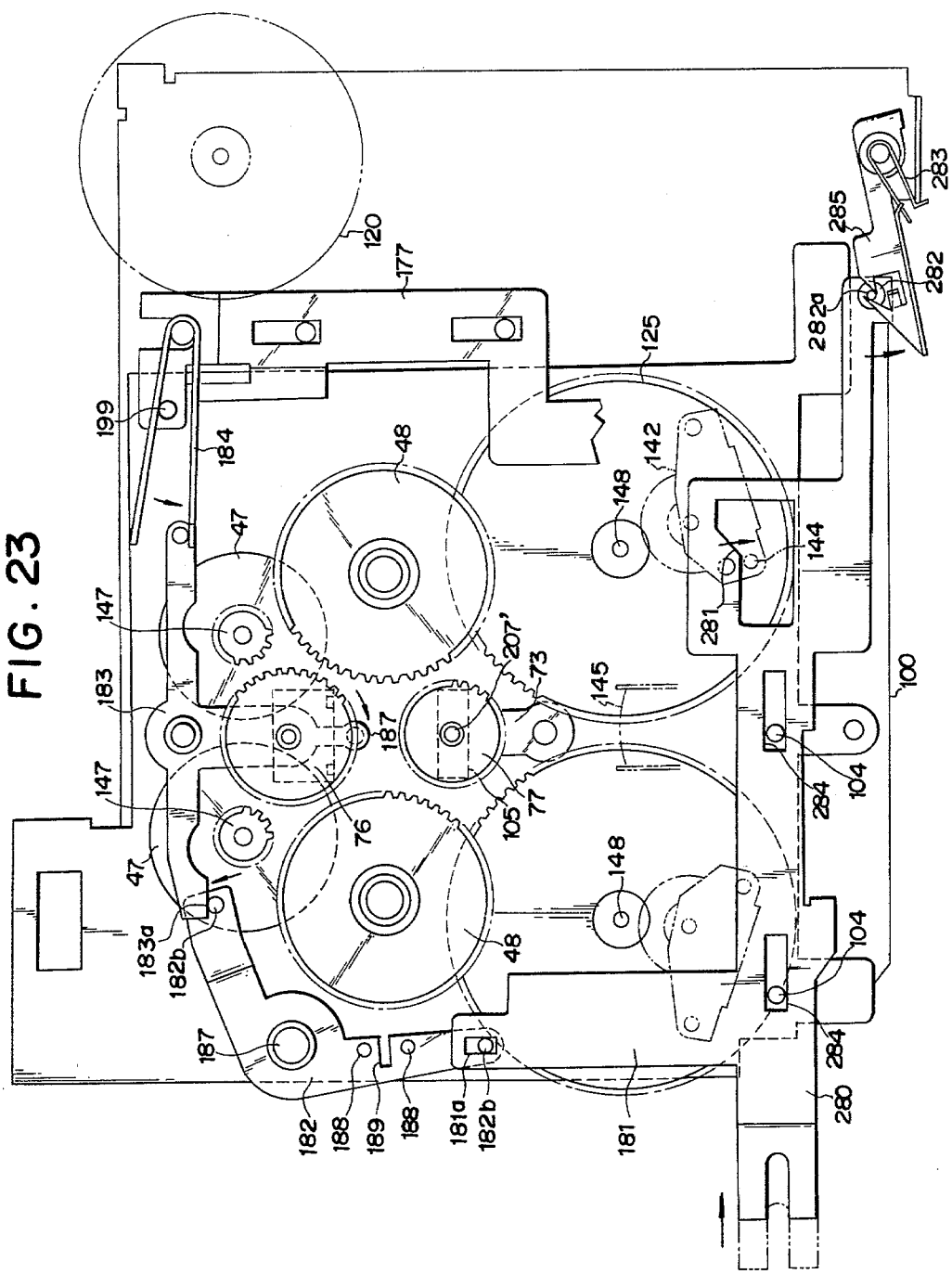

MAGNETIC TAPE RECORDING/REPRODUCING APPARATUS

TECHNICAL FIELD

This invention generally relates to a magnetic tape recording/reproducing apparatus, and more particularly to a car cassette tape recorder/player improved in various mechanisms thereof, especially in a cassette loading mechanism etc.

BACKGROUND ART

Heretofore, there have been proposed various mechanisms for loading a cassette into a tape recorder/player. These mechanisms, however, have such a defect that they are subject to a considerably large load during loading and/or ejecting of the cassette, preventing smooth operation thereof. These cassette type tape recorders/players have a prominent advantage over other types of tape recorders/players in that they can be formed thin and be of small-size because the cassette used therewith is thin and small, but, on the other hand, these tape recorders/players are difficult to design in a reliable manner because of the requirement that the various movable mechanisms and components thereof, such as a cassette receiving frame, an ejecting mechanism associated with the cassette receiving frame and a head plate mechanism, be smoothly and easily actuated by a force applied by the insertion of a thin small cassette. In addition, these components and mechanisms are each provided with a resetting spring. A similar and even greater problem exists with regard to the ejection of the cassette because the ejecting operation is carried out by a depressing operation of a tiny push button. The known cassette loading mechanisms have a further disadvantage that the structures thereof have been bulky.

DISCLOSURE OF INVENTION

It is therefore an object of the present invention to provide a magnetic tape recording/reproducing apparatus having a cassette loading mechanism free from the defects and disadvantages involved in the known cassette loading mechanisms.

It is a further object of the present invention to provide a magnetic tape recording/reproducing apparatus of a pushbutton type which is capable of being assembled with a pushbutton tuner for a car audio equipment having a fine unity of appearance.

It is a still further object of the present invention to provide a magnetic tape recording/reproducing apparatus of a pushbutton type which is capable of preventing undesirable troubles caused by inadvertent operation of the push buttons.

It is a still further object of the present invention to provide a magnetic tape recording/reproducing apparatus which is capable of repeating recording/reproducing and stop operation while holding a tape pack in a recording/reproducing position, without causing any trouble, and accordingly capable of eliminating a mechanical damage or deformation which may possibly be caused when the tape pack pulled halfway out of the apparatus is subject to vibration of a running car.

In accordance with the present invention, there is provided a magnetic tape recording/reproducing apparatus comprising: a slide plate adapted to be operated upon loading of a tape cassette; a swaying member interlocked with the slide plate and provided with an operating portion; a floating member having opposite end portions provided with projections, respectively, and an intermediate pivotally supported side portion confronting said operating portion of the swaying member; engaging members provided in association with said projections of the floating member, respectively; means for locking or releasing said projections of the floating member in or from said engaging members so as to change over the pivotal point of said floating member; an ejecting mechanism for ejecting said tape cassette; a slide frame interlocked with said slide plate and said ejecting mechanism; and a lock member for locking said slide plate and said slide frame each other through said floating member.

BRIEF DESCRIPTION OF DRAWINGS

FIG. 3 is a side view of the apparatus illustrated in FIG. 1, showing a structural relation between a baseplate for operating mechanisms, a head plate and another baseplate;

FIG. 4 is a fragmentary plan view showing a positional relation between an eject-operation lever, and a play-operation lever on the baseplate;

FIG. 5 is a plan view showing a structural and operational relation between an engaging member, a swaying member and an L-shaped lever on the baseplate for the operation mechanisms;

FIG. 6 is a similar plan view showing a structural and operational relation between the swaying member and a lock member;

FIG. 23 is a plan view of a mechanism for pause operation employed in the present invention.

BEST MODE FOR CARRYING OUT INVENTION

Figure 1:
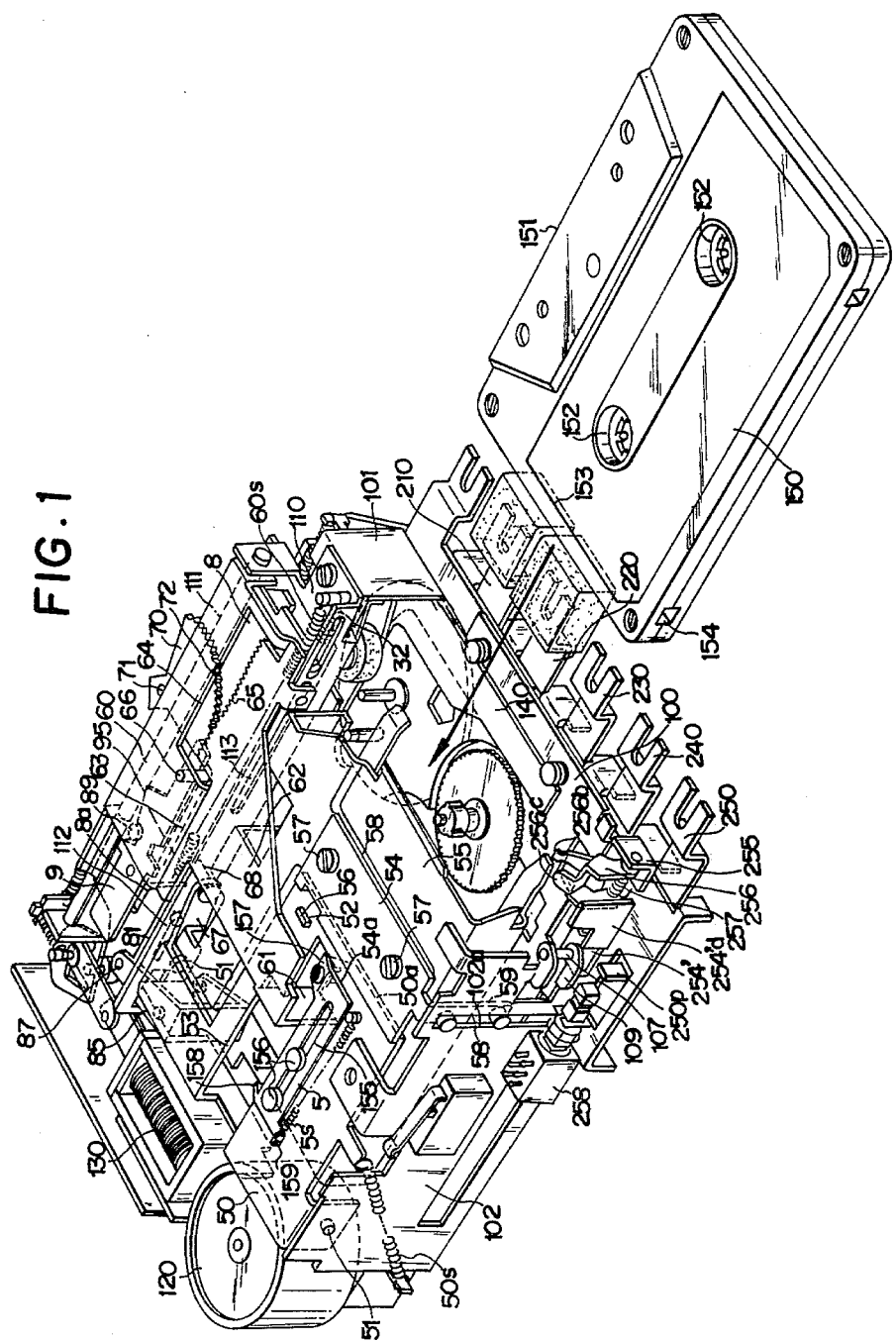
FIG. 1 is a perspective view of a magnetic tape recording/reproducing apparatus in accordance with the present invention.

Referring now to the drawings, there is illustrated a preferred form of a magnetic tape recording/reproducing apparatus in accordance with the present invention. A main chassis 100 has at a forward sideward portion thereof an upright portion 101. An operating mechanism baseplate 110 is fixed to the upright portion 101. A drive motor 120 and an electromagnetic plunger 130 is mounted on the main chassis 100 at an interior portion thereof. Another baseplate 200 is disposed under the main chassis 100 and attached thereto as illustrated in FIG. 3. On the baseplate 200 there are provided an eject-operation lever 210, a play-operation lever 220, a fast forward-operation lever 230, a rewind-operation lever 240 and a record-operation lever 250. These operation levers are of a pushbutton type and adapted to be depressed for carrying out the respective operations. A sidewall 102 is fixed to the main chassis 100 at a side portion thereof. The sidewall 102 and the baseplate 110 define a cassette loading or receiving area therebetween. A base end of a swingable member 50 is pivotally mounted by pins 51, 51 between the sidewall 102 and an upright portion 112 of the baseplate 110. A forward end of the swingable member 50 is connected to a cassette receiving frame 55 by a fitting plate 54, allowing a pivotal movement of the frame 55 relative to the swingable member 50. More specifically, the pivotal connection of the cassette loading frame 55 to the swingable member 50 is attained by a cooperation of a slot formed on the swingable member 50 and a projection formed on the frame 55 which are loosely engaged with each other. The connection is further attained by a cooperation of a convexed portion 58 formed on the cassette loading frame 55 as high as at least the thickness of the swingable member 50 and the fitting plate 54 fixed to the convexed portion 58 by screws 57, 57 so that an edge 54a of the convexed portion may a bit overhang a forward end 50a of the swingable member 50, leaving some space therebetween in a direction of the thickness thereof. Thus, the frame 55 is allowed to pivot relative to the swingable member 50 within a limit defined by said space therebetween but kept connected to the swingable member 50 by the slot 52 and the overlapped relation between the forward end 50a of the swingable member 50 and the edge 54a of the fitting plate 54.

An opening 53 is formed in the swingable member 50 at a central portion thereof. A slide plate 60 slidably provided on the base plate 110 extends to the opening 53 and has a tip end portion 61 bent downwardly and received in the opening 53. The bent tip end portion 61 of the slide plate 60 is brought into contact with a tip end of a cassette 150 when the cassette 150 is loaded in the cassette loading area so that the slide plate 60 slides according to the retreat of the cassette 150. The cassette 150 has, as known cassettes, a recording/reproducing face 151 on a longer side thereof, holes 152, 152 for receiving reel driving members therein respectively and a tape provided between reels disposed around the holes 152, 152, respectively and guided into the recording/reproducing face 151. A stepped portion 153 is also formed on the cassette 150 at a peripheral portion thereof. A head 145 and pinch rollers 141, 141 are mounted on a head plate 140, which is mounted on the main chassis 100 and adapted to be actuated by the play-operation lever 220. The fitting plate 54 has a sideward bent portion 58' extending downwardly and provided with a guide 59. The guide 59 is engaged with a guide slot 102a of the sidewall 102 so as to guide the cassette loading frame 55 into a recording/reproducing position.

Figure 8:
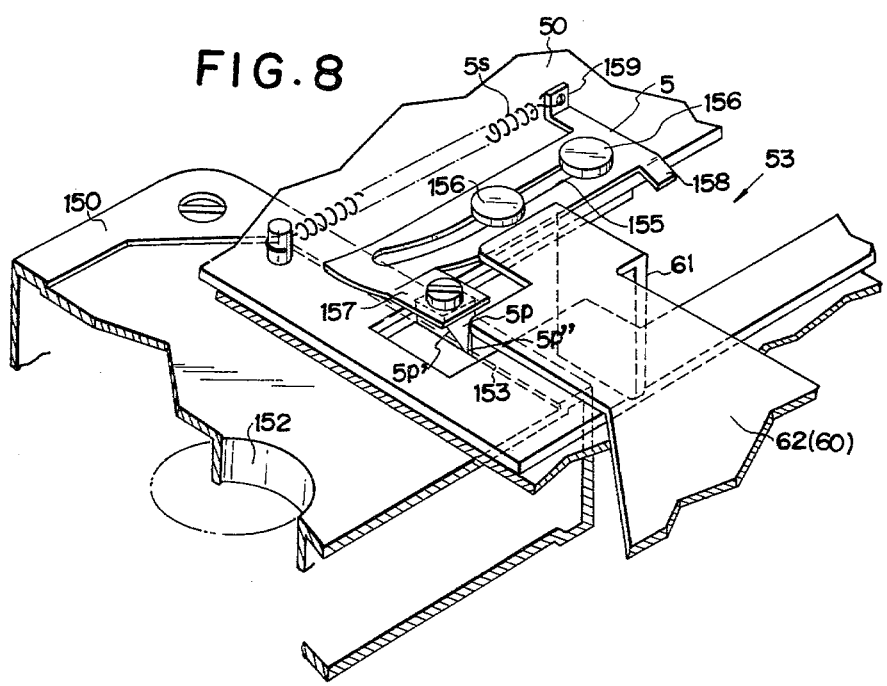
FIG. 8 is a fragmentary perspective view of a mechanism for preventing disengagement of the tape pack from the engaging member.
Figure 9A:
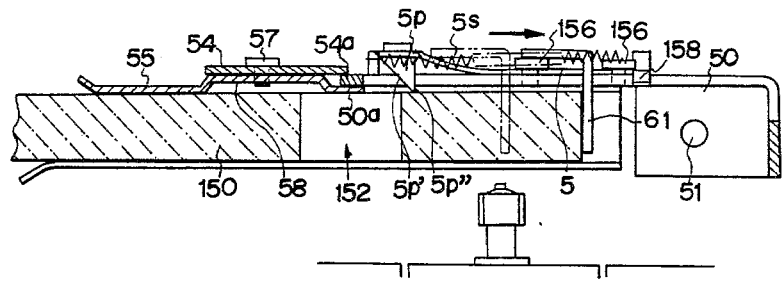
FIGS. 9A, 9B, 9C and 9D show cassette loading and unloading operations by stages.
Figure 9B:
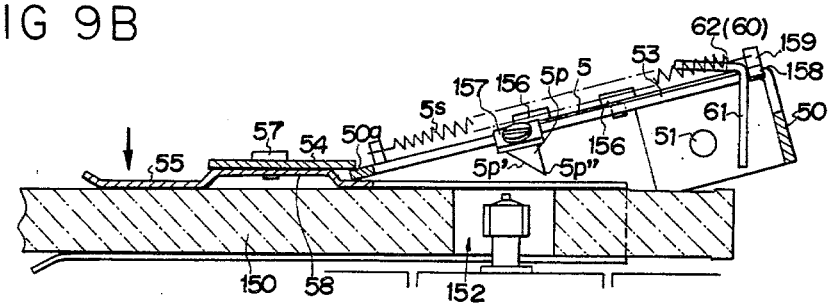
Figure 9C:
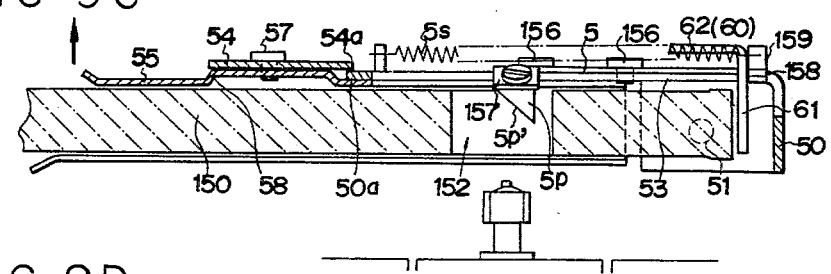
Figure 9D:
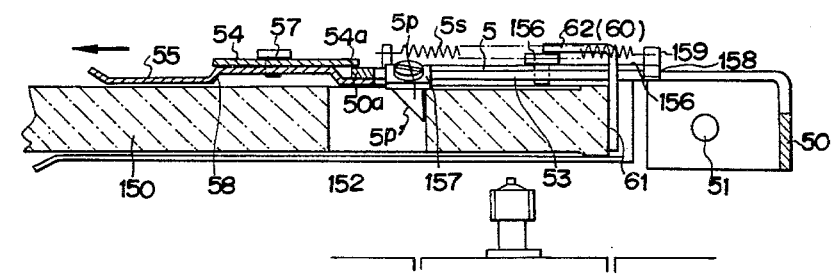

A mechanism for lowering the cassette 150 loaded in the cassette loading frame 55 into the recording/reproducing position is illustrated in FIG. 8, and the operational relationship therebetween is illustrated in FIG. 9. More particularly, an engaging plate 5 is provided on the swingable plate 50 so as to slide along the opening 53 of the swingable plate 50 by means of a guide slot 155 formed thereon and pins 156, 156 engaged with the slot 155. The engaging plate 5 has a spring rest 159, and a spring 5s is provided between the spring rest 159 and the swingable frame 50 to urge the slide plate 5 forwardly. The engaging plate 5 further has a forward first engaging portion 157 and a rearward second engaging portion 158. These engaging portions 157 and 158 extends over the opening 53 and bent so as to project into the opening 53. An engaging member 5p is fixed to the first engaging portion 157 as depicted in FIGS. 8 and 9. The engaging member 5p has, at a bottom portion thereof, an inclined face 5p' adapted to be raised by the tip end of the inserted cassette 150 for facilitating the loading of the cassette 150, and has an engaging portion 5p" adapted to engage with the holes 152 of the cassette 150. Although the engaging plate 5 is resilient and deflects when the cassette 150 is inserted in the arrangement as illustrated, the engaging plate 5 may be made as a rigid plate. Where the rigid material is used, spring members may be provided, for example so as to impart a resilient action to the engaging portions 157 and 158.

A cassette loading and unloading operation is illustrated in FIG. 9 according to stages thereof. Before the tip end of the cassette 150 is brought into contact with the bent portion 61 of the slide plate 60, the cassette 150 engages and raises the engaging member 5p through the inclined face 5p' without pushing engaging plate 5. When the cassette 150 is further moved rearwardly after it has been brought into contact with the bent portion 61 of the slide plate 60, the plate 60 is pushed backwardly and the bent portion 61 of the plate 60 is in turn brought into contact with the engaging portion 158 so as to push the engaging plate 5 backwardly. Thus, the cassette 150 is pushed to a base portion of the swingable member 50, thereby to release a lock mechanism which has held the swingable member 50 in a horizontal position, allowing the swingable member 50 to be inclined to locate the cassette loading frame 55 on the main chassis 100 as illustrated in FIG. 9(B). Though the engaging member 5p is not in contact with the cassette 150 in the state illustrated in FIG. 9(B), it will engage with the hole 152 of the cassette 150 when the swingable frame 50 resumes a horizontal position and the cassette 150 is raised upon ejecting operation as illustrated in FIG. 9(C). During the ejecting operation, the slide plate 60 slides forwardly to push the engaging member 5p forwardly. In this connection, it is to be noted that since the spring 5s starts to act upon the forward movement of the slide plate 60, the engaging plate 5 and the slide plate 60 become surely and positively restored and a sufficient inertia force is applied to the cassette 150 for pushing the same outwardly. Said inertia force makes the engaging member 5p disengage from the hole 152 and rest at the engaging portion 5p" on the stepped portion 153 of the cassette, putting the cassette 150 in a standby state where the cassette 150 is sufficiently projected from a cassette loading opening to facilitate removal of the cassette.

In the cassette loading mechanism contemplated in the present invention, the slide plate 60 is adapted to slide through engagement with a guide rod 111 provided on the baseplate 110 along the length thereof and another engagement with a guide slot 113 formed on the upright portion 112. The slide plate 60 has an arm portion 62 which extends over the upright portion 112 in the cassette loading area. The arm portion 62 is bent downwardly at the rearward tip end thereof, to form the engaging end 61. The slide plate 60 further has a step 63 and an opening 64 formed at the central portion thereof along the step 63. A rack portion 65 extends from the arm portion 62 in the same plane as the opening 64. A swaying member 70 is rotatably mounted on the baseplate 110 by a shaft 71 and provided with an arcuate gear portion 72 in mesh with the rack portion 65. As can be best seen from FIGS. 2, 5 and 6, the swaying member 70 is formed into a channel shape, and has an upper planar portion with the gear portion 72 formed at the periphery thereof and a lower planar portion with an operating portion 74 formed at a tip end thereof.

A slide frame 8 is mounted on the baseplate 110 and has sidewalls 81, 82 formed integrally with the slide frame 8. An engaging member 81a is provided on the sidewall 81 and engages with a guide slot 114 formed on the upright portion 112 at a forward end thereof. A guide slot 82a is formed on the sidewall 82 and engaged with a pin 115 provided on the baseplate 110. Thus, the slide frame 8 is adapted to slide within a limit defined by the guide slots 114 and 82a. The slide frame 8 further has a hook portion 83 formed at a rearward end thereof. The hook portion 83 (FIG. 6) is engaged with an engaging pin 87 provided on an upper portion of a channel-shaped operating member 83 pivotally supported by a shaft 86 at the interior of the main chassis 100.

Another engaging pin 88 is provided on a lower portion of the operating member 85. The engaging pin 88 extends downwardly to project through an arcuate slot 108 formed in the main chassis 100, and engages with a hook portion 91 of an interlocking member 90 disposed in a plane parallel to a plane in which the eject-operation lever 210 is disposed, as illustrated in FIG. 3. The slide frame 8 further has an opening 84 (FIG. 6) formed at a forward portion thereof. The opening 84 receives therein a pin 31 which is provided at an end of a turning member 30 (FIG. 5) pivotally supported intermediate thereof on the baseplate 110. A spring 32 is provided between an upper end portion of the pin 31 projected from the slide frame 8 and the baseplate 110. Another pin 33 provided on the turning member 30 at the opposite end thereof is engaged with an elongated slot 34 (FIG. 5) formed at a free end portion of an engaging member 35 which is also pivotally supported on the baseplate 110. The engaging member 35 has, at the free end portion thererof, a hook portion 36 and an slanting guide edge 37 adjacent the hook portion 36 as depicted in FIG. 5. On the other hand, a floating member 40 is further provided on the base plate 110 and has a projection 39 at an end thereof. The projection 39 is adapted to abut against the hook portion 36 or the slanting edge 37. The floating member 40 further has a projection 38 at the opposite end thereof and a projection 41 adjacently to the projection 39. The projection 41 is disposed within an area of a pivotal movement of the operating portion 74 of the swaying member 70. In this connection, it is to be noted that the projection 38 of the floating member 40 is so formed that it projects from an upper and a lower face of the floating member 40. The downwardly projected portion of the projection 38 is engaged with an arcuate slot 119 formed on the base plate 110 and regulates the rotating movement of the floating member 40 around the projection 39 as depicted by a solid line and a phantom line in FIG. 5. The upper portion of the projection 38 is adapted to abut against an engaging portion 43 formed at an end of another engaging member, an L-shaped lever 45 mounted on the baseplate 110 by a shaft 44. Another end of the L-shaped lever 45 projects a bit out of the baseplate 110 to form a hook portion 42. A spring 118 is provided between the hook portion 42 and a spring rest 117 formed at the interior of the baseplate 110. The floating member 40 has a protruded cam portion 46 intermediate thereof. An operating portion 75 provided on the lower face of the swaying member 70 so as to project downwardly therefrom is adapted to abut against the cam portion 46 of the floating member 40, so that the floating member 40 is displaced upon movement of the swaying member 70. The working range and stroke of the floating member 40 is adjustable by varying the position and/or the configuration of the cam portion 46.

Figure 2:
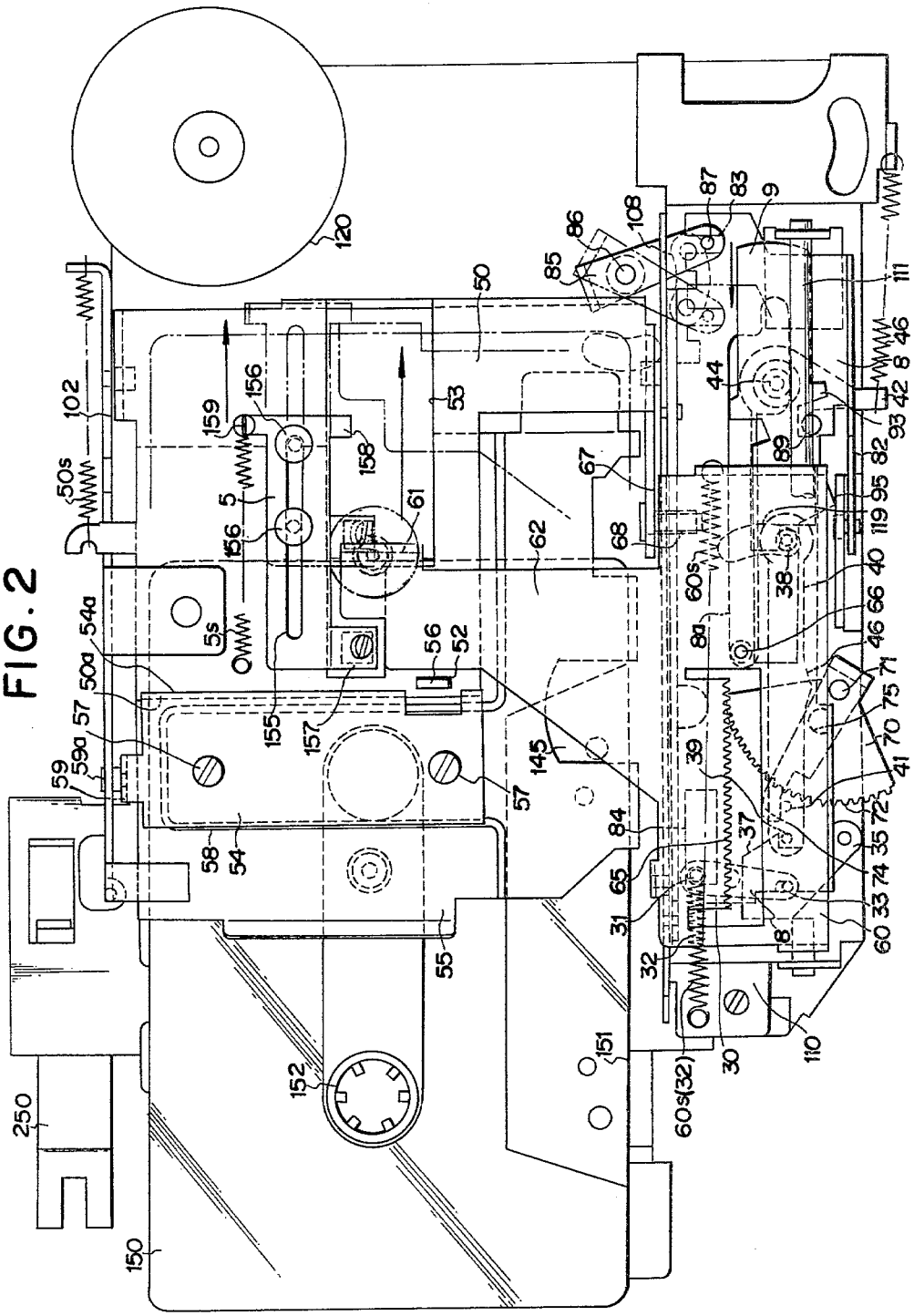
FIG. 2 is a plan view of the apparatus illustrated in FIG. 1.

Above the L-shaped lever 45 another lock member 9 is supported by the shaft 44. The lock member 9 has, on one side thereof, a projected portion 91 engageable with a pin 66 provided on the lower face of the slide plate 60 and projected through a guide slot 8a formed on the slide frame 8 and a recessed portion 92 adjacent to the projected portion 91. The lock member 9 further has, at another side thereof, a projected portion 93 engageable with a projection 89 provided on the slide frame 8, a recessed portion 94 adjacent to the projected protion 93 and a slanting guide portion 95 adjacent to the recessed portion 94. The lock plate 9 is thus adapted to lock the slide plate 60 and the slide frame 8. When the cassette 150 is not loaded, the projection 89 of the slide frame 8 is engaged with the recessed portion 94 to prevent a forward movement of the slide frame 8 as illustrated in FIG. 2. If the cassette 150 is put into the apparatus and pushed inwardly, the slide plate 60 is caused to move rearwardly and, accordingly, the pin 66 thereon is also moved rearwardly along the guide slot 8a. Eventually, the pin 66 hits and pushes the projected portion 91 to rotate the lock member 9 clock-wise as viewed in FIG. 6, keeping an arcuate rear end 96 of the lock member 9 engaged with a mounting seat of the guide rod 111, to wit, around the engaging portion. The lock of the slide frame 8 is then released. The released slide frame 8 is pulled forwardly by the action of the spring 90s (FIG. 3) provided on the interlocking member 90, and the projection 89 on slide frame 8 pushes the inclined guide portion 95, as illustrated in FIG. 6, to further rotate the lock member 9 clockwise and to locate the pin 66 in the recessed portion 92 for locking the slide plate 60 in a rear position. When the operation lever 210 is pushed inwardly for effecting a cassette ejecting operation and the slide frame 8 is caused to more rearwardly through the operating member 85, the projection 89 pushes the projected portion 93 of lock member 9 to rotate the lock member 9 counterclockwise and disengage the pin 66 from the recessed portion 92. Then, the slide plate 60 returns to its original position by the action of the spring 60s. The pin 66 moves along a linear edge 97 of the lock member 9 and the lock member 9 is restored to a state as illustrated in FIG. 2, where the projection 89 is received in the recessed portion 94 to lock the slide frame 8.

Figure 7:
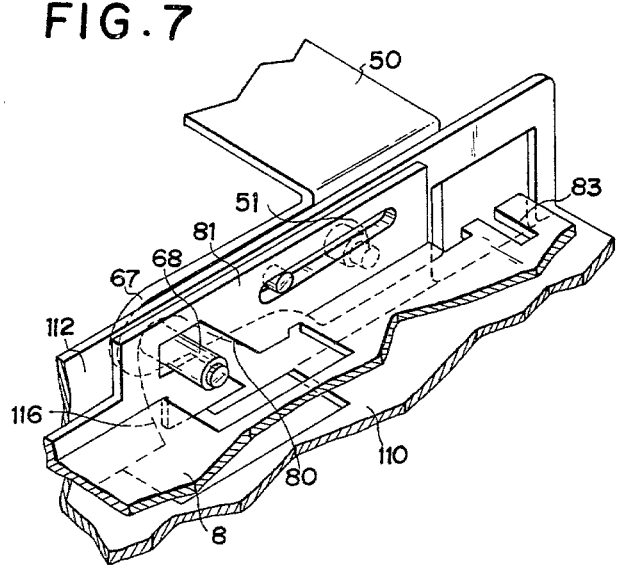
FIG. 7 is a fragmentary perspective view of a mechanism for lowering a cassette.

The slide frame 8 has a cam slot 80 formed on the side wall 81 as depicted in FIG. 7. The upright portion 112 of the baseplate 110 has a cutout 116. A roller 68 projects through the cam slot 80 and a cutout 116. The roller 68 is carried on an arm portion 67 extending from swingable member 50 along the upright portion 112. When the cassette is fully pushed inwardly and the slide frame 8 is pulled forwardly, the cam slot 80 acting on the roller 68 lowers the arm portion 67 so that the swingable member 50 is inclined downwardly to put the cassette loading frame 55 onto the main chassis 100. On the other hand, when the cassette 150 is ejected, the slide frame 8 moves in an opposite manner to that just described so that the swingable frame 50 resumes its horizontal position and the cassette loading frame 55 is raised from the main chassis 100. In this connection, it is to be noted that a spring 50s is provided between a forward portion of the swingable member 50 and the sidewall 102 as illustrated in FIG. 1. Therefore, the lowering of the cassette loading frame 55 onto the main chassis 100 is carried out smoothly.

The head plate 140 mounted on the main chassis 100 is adapted to be actuated by the play-operation lever 220. To this end, an operation member 22 is provided on the shaft 86 which extends downwardly from the main chassis 100 as depicted in FIGS. 3 and 4. More specifically, the operation member 22 is formed in a channel-shape and has a pivotal support portion 226, a first projection 227 formed on a lower portion of the member 22 and a second projection 228 formed on an upper portion of the member 22 and extending in a direction perpendicular to the first projection 227. The projections 227 and 228 have pins 229, respectively. The projection 227 is engaged with a hook portion 220a of the play-operation lever 220. The projection 228 is engaged, through the arcuate slot 103 of the main chassis 100, with an elongated slot 143 of the head plate 140 which is slidably mounted on the main chassis 100. The eject-operation lever 210 and the play-operation lever 220 are attached to the lower face of the baseplate 200 and are provided with resetting springs 210s and 220s, respectively. The operating levers 210 and 220 further have pins 211 and 221, respectively. These pins 211 and 221 are engaged with cam slots 261 and 262 formed on a lock plate 260 slidably attached to the baseplate 200, respectively. More particularly, the lock plate 260 is attached to the baseplate 200 through engagement between pins 202, 202 provided on the baseplate 200 and elongated slots 266 extending in the direction of the width thereof, so that the lock plate 260 is slidable in a direction perpendicular to the operating directions of the operation levers 210 and 220. The cam slot 261 of the lock plate 260 has a simple diagonal cam portion 261c. The cam slot 262 has a similar simple diagonal cam portin 262c and a diagonal cam portion 262d extending in a direction opposite to that of the portion 262c and a lock portion 262f as depicted in FIG. 4. Accordingly, the pin 221 is adapted to act on the cam portion 262d for displacing the lock plate 260 and is adapted to be forced into the interior portion thereof. The pin 221 is then pulled by the action of the resetting spring 220s to be locked by the lock portion 262f. The interlocking member 90 disposed in parallel with the eject-operation lever 210 has the hook portion 99 formed at a rearmost portion thereof and an engaging portion 191 formed at a forward portion thereof so as to project towards the eject-operation lever 210. A spring 90s is provided extending between a pin 192 which is provided at the forward portion of the interlocking member 90 and the baseplate 200. The interlocking member 90 further has a pin 193 provided intermediate thereof, which is adapted to abut against a linear engaging portion 267 of the lock plate 260.

In the so constructed magnetic tape recording/reproducing apparatus of the present invention, it will be seen that when a cassette 150 is put in the cassette loading frame 55 as illustrated in FIG. 1, the leading end of the cassette 150 pushes the bent end 61 of the slide plate 60 to move the slide plate 60 backwardly as indicated by an arrow in FIG. 2. Upon the retreat of the slide plate 60, the swaying member 70, with the gear portion 72 is mesh with the rack portion 65, is turned around the shaft 71. The turning of the swaying member 70 allows the operating portion 74 to disengage from the projection 41 and the operating portions 75 and move against a side of the floating member 40 to rotate the same around the projection 39. The L-shaped lever 45 is then rotated clockwise, as viewed in FIG. 5, around the shaft 44 against the action of a spring 118. In view of the configuration of the cam portion 46 as illustrated in FIG. 5, it is apparent that in the position of the swaying member 70 as illustrated in FIG. 5, the projection 38 is in the most deflected position within the arcuate slot 119 and the spring 118 is stretched to its maximum degree. When the slide plate 60 is further pushed inwardly, the operating portion 75 thereof passes over an apex of the cam portion 46 and is released from the spring pressure by the cam portion 46, so that the L-shaped lever 45 and the floating member 40 return to their former positions, respectively, by the action of the spring 118. In other words, when a loading force is applied to the cassette, until it reaches the position of FIG. 5 it is automatically drawn inwardly by the action of the spring 118.

In the course of the retreat of the slide plate 60 along the guide slot 113, the pin 66 engages the pushes the projection 91 just before the slide plate 60 reaches it final position. Then, the lock member 9, which has been located in a position as illustrated by phantom line in FIG. 5, is rotated and moved into a position as illustrated in FIG. 6, where the pin 66 of slide plate 8 is received in a recessed portion 92 of member 9 to lock the slide plate 60. On the other hand, the projection 89 on slide plate 8, which has been received in the recessed portion 94 of the member 9 is disengaged from the portion 94 to release the holding action on the slide frame 8 as illustrated in FIG. 6. The thus released slide frame 8 is restored from a position as illustrated by a phantom line in FIG. 6 to a position as illustrated by a solid line in FIG. 6 by the action of the spring 90s mounted between the interlocking member 90 and the baseplate 200 as illustrated in FIG. 4. The projection 89 is pressed against the slanting guide edge portion 95 to ensure the locking of the pin 66 with the lock member 9. As the slide frame 8 is restored, the roller 68 provided on the arm portion 67 of the swingable member 50 is displaced from the interior of the cam slot 80 of the slide frame 8 to a lower opening portion of the cam slot 80. The forward end of the swingable member 50 is then lowered and the cassette received in the cassette loading frame 55 is set in the recording/reproducing position on the main chassis 100.

When the eject-operation lever 210 is pushed inwardly for ejecting the cassette 150, the salient portion 212 of the lever 210 causes the interlocking member 90 to retreat conjointly. This will further push the slide frame 8 inwardly through an engagement between the hook portion 99 and the engaging pin 88. As the opening 84 formed at the forward portion of the slide frame 8 moves backwardly, the pin 31 of the turning member 30 is displaced from a position as illustrated by a solid line in FIG. 6 to a position as illustrated by a phantom line in the figure. Then, the projection 39 is released from the locking by the hook portion 36 as illustrated in FIG. 5. After the projection 39 is released from the hook portion 36, floating member 40 rotates around the projection 38 engaged with the engaging portion 43. On the other hand, upon its retreat within a limit of the opening 84, the projection 89 of the slide frame 8 passes over the recessed portion 94 and pushes the projection portion 93, so that the lock member 9 is rotated in the opposite direction to that in the cassette loading operation, to release the pin 66 from the recessed portion 92. When the pin 66 is released, the slide plate 60 is restored to its former position by the action of the spring 60s which has stored an energy during the cassette loading operation. The pin 66 is then restored along the guide slot 8a, pushing the linear side 97 of the lock member 9. Thus, the locking of the projection 89 in the recessed portion 94 is assured and the slide frame 84 is positively locked in the position. On the other hand, according to the restoration of the slide plate 60, the swaying member 70 which has been in a position as illustrated in FIG. 6 is turned in the opposite direction to that in the cassette loading operation. Just before the turning of the swaying member 70 has been completed, the operating portion 74 is brought into engagement with the pin 41 of the floating member 40 which is in a position as illustrated by a phantom line in FIG. 6. Then, the floating member 40 is rotated around the pin 38 to a position as illustrated by a broken line. During the rotation of the floating member 40, the projection 39 pushes the engaging member 35 as it rides along the slanting guide edge 37 thereof against the action of the spring 32 which acts thereon through the turning member 30, and the projections 39 is engaged by the hook portion 36 under the force of spring 32 as illustrated in FIG. 5. The roller 68, which has been moved to the lower opening portion of the cam slot 80 by the inward movement of the slide frame 8 as the cassette was loaded, is displaced into an upper and interior portion of the cam slot 80, to raise the arm portion 67 of the swingable frame 50 as illustrated in FIG. 7. The thus raised cassette 150 is then pushed outwardly by the slide plate 60 which returns by the action of the spring 60s.

In association with the operation of the cassette 150 as mentioned above, the recording/reproducing head 145 and pinch rollers 141 are operated upon actuation of the play-operation lever 220. More particularly, the head 145 and the pinch rollers 141 are mounted on the head plate 140 and adapted to be operated by the play-operation lever 220. As apparent from FIGS. 3 and 4, upon pushing the play-operation lever 220 inwardly, the head plate 140 is actuated to advance into the recording/reproducing position, and the pin 221 is locked by a lock portion 262f of the lock plate 260 to establish a recording/reproducing mode. In case the recording mode is established, the lock plate 260 is displaced a bit downwardly as viewed in FIG. 4, to bring the pin 221 into engagement with the lock portion 262f. Then, the interlocking member 90 through a pin 198 thereon engaging the stepped portion 268 of the lock plate 260 is tilted into a position where a free end of the engaging portion 191 thereof is lowered as viewed in FIG. 4, to wit, a position where the engaging portion 191 does not engage the salient portion 212 of the eject-operation lever 210 when the lever 210 is pushed inwardly. Under these circumstances, when the play-operation is suspended, the eject-operation lever 210 is depressed inwardly since the eject-operation lever 210 is adapted to effect both the eject operation and the stop-operation in the apparatus as disclosed and illustrated. It will then be seen that when the operation lever 210 is depressed under the conditions of the play-operation, the operation lever 210 is moved inwardly without the salient portion 212 thereof contacting with the engaging portion 191. Therefore, the pin 211 acts on the cam portion 216c to displace the lock plate 260 upwardly as viewed in FIG. 4, so that the locking of the play-operation lever 220 is released and the lever 220 is restored. Then, the head plate 140 retreats from the advanced recording/reproducing position and the head and the pinch rollers are released from the recording/reproducing mode. In other words, in such a stop mode, only the head plate 140 is caused to retreat, and the cassette 150 is not pulled up from the main chassis and projected from the apparatus as in the known apparatus.

When the stop mode is established, the pin 211 enters the interior of the cam slot 261 so that the lock plate 260 is displaced upwardly and the engaging portion 191 returns to the position as illustrated in FIG. 4. Of course, the aforesaid stop operation is carried out prior to the restoration of the interlocking member 90. On the other hand, if the play-operation lever 220 is depressed inwardly again in such a stop mode, the play-mode as mentioned above is realized. Similarly, the stop and the play-mode can be repeated according to necessity.

In accordance with the arrangement as mentioned above, a floating member is provided in relation with a swaying member adapted to rotate in association with a slide plate movable upon insertion of a cassette or other tape unit; projections are provided on opposite ends of floating member; the engaging members are provided in relation with the projections, respectively; and the engaging members are adapted to engage with and disengage from the projections, respectively, to change over pivotal points of the floating member. Stated more illustratively, when an operating force is applied to the floating member intermediate the ends thereof, while keeping one end thereof at a fixed position, the other end thereof acts as an operative end. On the other hand, when the fixing of said one end is released and an operating force is applied similarly to the intermediate portion of the floating member, said end portion acts as a free end, namely, an operative end. This specific arrangement, when applied to a tape pack loading mechanism, can provide a mechanism which can smoothly perform the loading and ejecting of the cassette with a relatively simple structure.

Further an eject-operation lever and a play-operation lever along with a fast forward-operation lever, rewind-operation lever and record-operation lever, as described, can be attractively and compactly arranged alongside a pushbutton tuner assembled therewith to provide a unified compatible appearance. Moreover, the load applied during the operations described is divided among several elements. Also, the initial force involved in inserting the cassette into the recording/reproducing apparatus described is used for completion of the cassette loading and ejection. By the operation of the eject-operation lever, the raising and lowering of the cassettes are effected. By the operation of the play-operation lever, the advance and retreat of the head and the pinch rollers are effected. Thus, the force required for carrying on each operation is minimized.

Further, since a cam portion is formed on the floating member and the swaying member is provided with an operating portion engageable with the cam portion, the floating member effects a click rolling operation by the swaying member, and the timing and range of the click rolling is regulated. Furthermore, the click rolling operation can be suitably adjusted by varying the position and contour of the cam portion.

The preferred magnetic tape recording/reproducing apparatus of this invention has an improved operation lever mechanism. In general, a tape recording/reproducing apparatus has an eject-operation lever for carrying out a cassette ejecting operation. This eject-operation lever acts, when actuated, to raise a cassette in a recording/reproducing position on the main chassis and to push the same into a position where it projects from a cassette loading opening. Therefore, where the apparatus is used as a car unit, the cassette in this position is extremely unstable and generates a noise when it is subject to vibration of a running car. Such vibration can cause mechanical damage to the cassette. In addition, the known mechanism further has a shortcoming that when the cassette is required to be set in a recording/reproducing position again, the same procedure as for loading a new cassette must be taken.

A feature of the present invention contemplates an operation lever which can effect both an ejecting operation and a play-stop operation without causing the cassette to project from the loading opening. In other words, the single operation lever has different functions depending upon the operational conditions of the tape recording/reproducing apparatus. Thus, the ejecting operation is carried out only when none of the operations, such as a recording/reproducing, fast-forward tape feeding or a rewinding operation is not called for.

More particularly, in the tape recording/reproducing apparatus as disclosed above and illustrated in FIGS. 1 to 9, a lock plunger 160 is provided under the electro-magnetic plunger 130. The plunger 160 is adapted to be energized when any one of the play-operation lever 220, the fast forward-operation lever 230 and the rewind-operation lever 240 is pushed inwardly to lock said lever.

Figure 10:
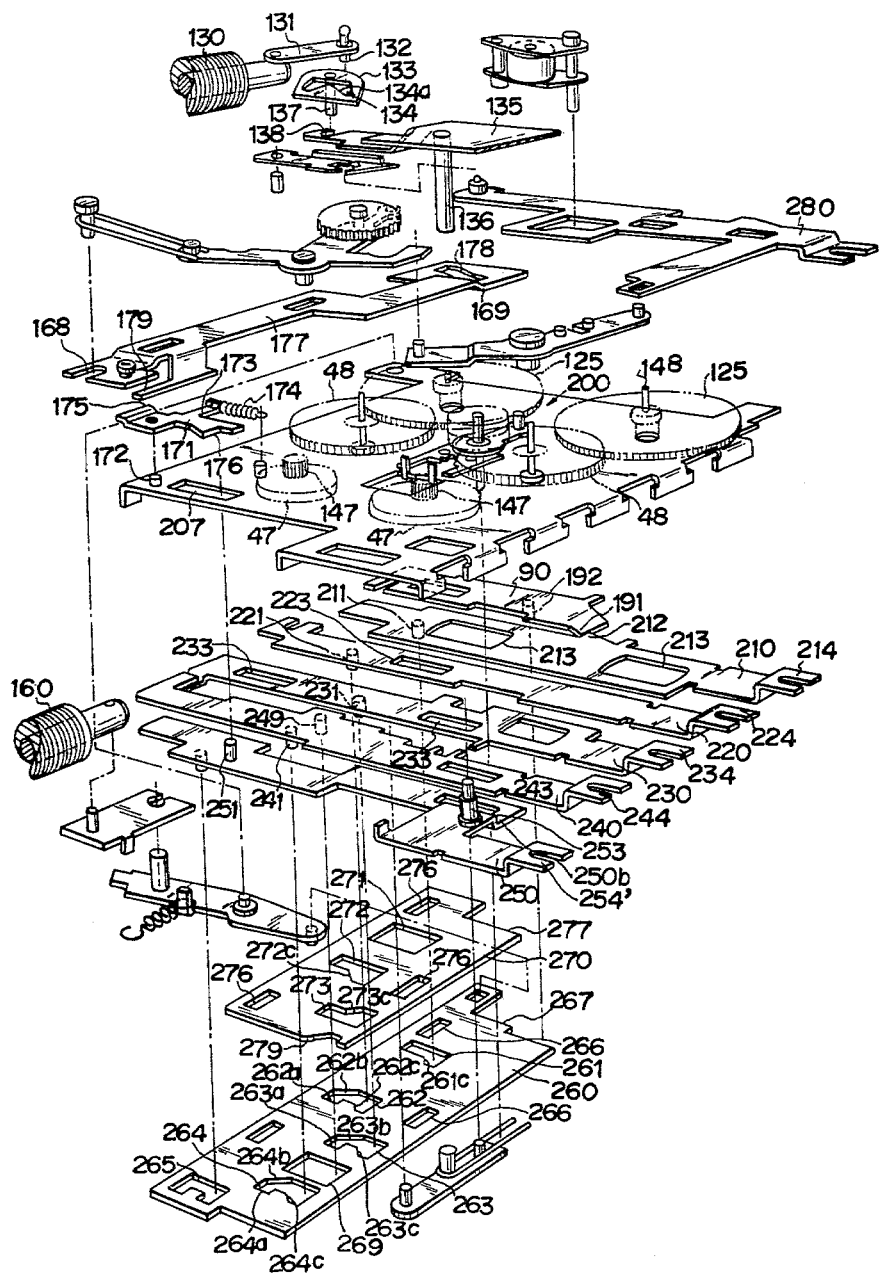
FIG. 10 is an exploded perspective view of components of the apparatus mounted on the baseplate.
Figure 11:
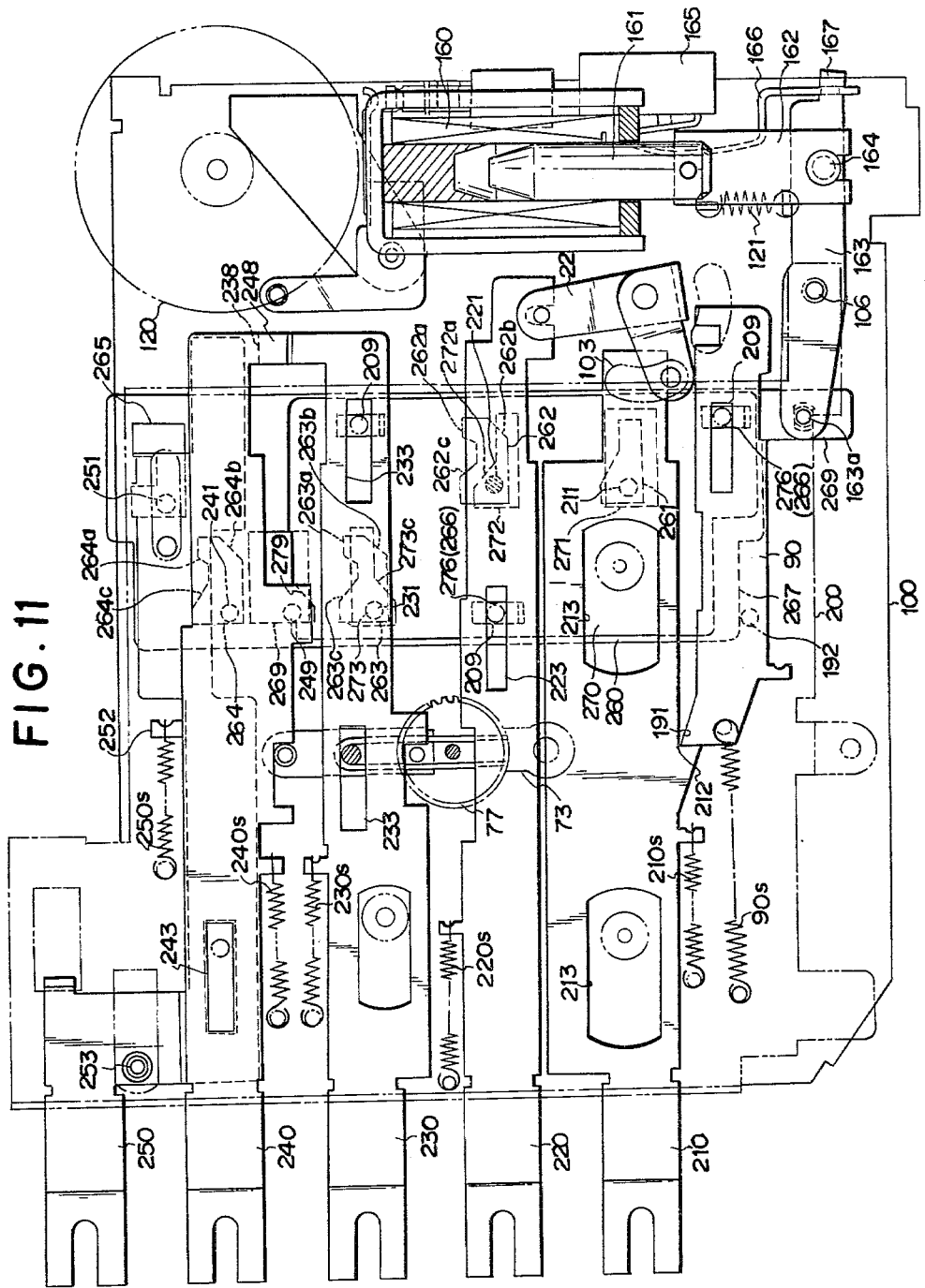
FIG. 11 is a plan view of the component illustrated in FIG. 10 which are mounted on the baseplate.
Figure 12:
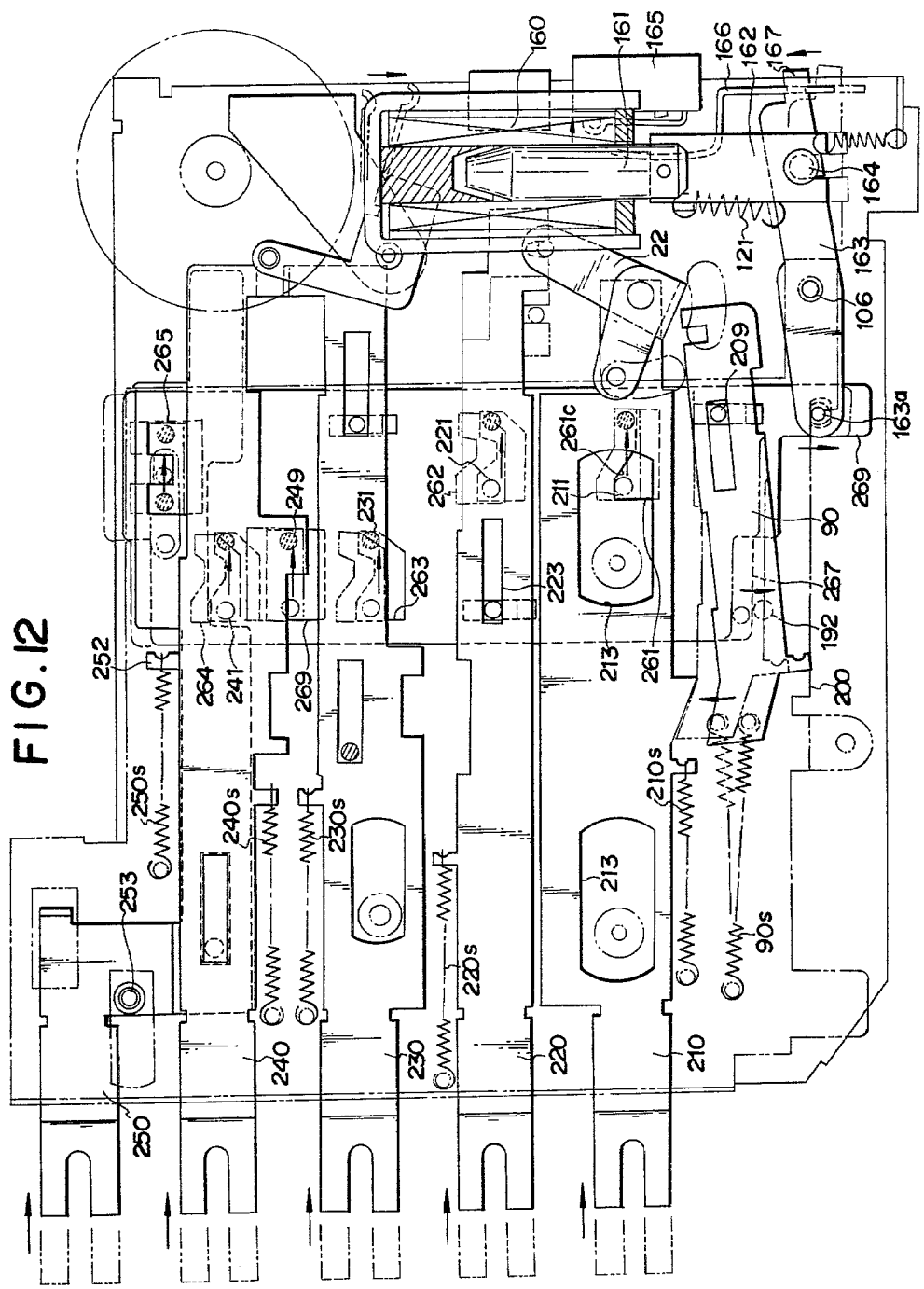
FIG. 12 is a similar view showing an operational relation between the components.

Various components of the tape recording/reproducing apparatus which are associated with the baseplate 200 are illustrated in FIG. 10 in an exploded state and in FIG. 11 in an assembled state. The operational relationships between the components are illustrated in FIG. 12. Illustratively stated, three guide pins 209, 209, 209 are provided on the bottom face of the baseplate 200 at an inner portion and intermediate portion thereof, respectively. The guide pins 209, 209, 209 are engaged with elongated slots 276 of an auxiliary lock plate 270 and elongated slots 266 of the lock plate 260, respectively. Between the auxiliary lock plate 270 and the baseplate 200 are disposed the levers 210, 220, 230, 240 and 250 juxtaposed in relation to each other. The ejecting interlocking member 90 is also disposed between the base plate 200 and the auxiliary lock plate 270, as can be seen from FIG. 11. The auxiliary lock plate 270 is wide enough to generally cover the first to third operation levers 210 to 230. The fifth operation lever 250 is bent at 250b in the direction of the thickness thereof, so that the fourth operation lever 240 is superposed on the fifth lever at a forward and intermediate portion thereof. Thus, there is left no substantial space in the thickness direction between the lower face of the baseplate 200 and the upper face of the lock plate 260. The operation levers have engaging pins 211, 221, 231, 241 and 251, respectively. These engaging pins 211, 221, 231, 241 and 251 are fitted in cam slots 261 to 256 formed on the lock plate 260, and in an opening 271 and cam slots 272 and 273 formed on the auxiliary lock plate 270, respectively, so as to allow the operation levers to slide in the longitudinal direction thereof, respectively. The fourth lever 240 has another engaging pin 249 which is adapted to abut on a cam portion 279 formed on a periphery of the auxiliary lock plate 270 and received in an opening 269 formed on the lock plate 260. Springs 210s, 220s, 230s, 240s and 250s are provided on the operation levers 210 to 250, respectively, to urge the levers in directions to reset them, respectively. The interlocking member 90 is also provided with the resetting spring 90s which is mounted between the interlocking member 90 and the baseplate 200. The first operation lever 210 has the salient portion 212 formed on the periphery thereof, which is adapted to engage with the engaging portion 191 formed on a side of the interlocking member 90. The interlocking member 90 further has a pin 192 adjacently to the engaging portion 191, which is adapted to abut against an engaging portion 267 formed on the lock plate 260 and a simple cutout 277 formed on the auxiliary lock plate 270.

The cam slot 261 of the lock plate 260 has the cam portion 261c which cooperates with the engaging pin 211 to disengage the lock plate 260 from the pin 192 by releasing the engaging portion 267 thereof from the pressure applied by the pin 192 when the first operation lever 210 is pushed inwardly. The can slots 262, 263 and 264 also have cam portions 262c, 263c and 264c, respectively, which cooperate with the pins 221, 231 and 241, respectively, to disengage the lock plate 260 from the pin 192 by releasing the engaging portion 267 from the pressure by the pin 192. In addition, the cam slots 262, 263 and 264 have cam portions 262b, 263b and 264b, respectively, to force the lock plate 260 and press the engaging portion against the pin 192. As illustrated in FIG. 10, the cam slots 262 to 264 further have recessed portions 262a, 263a and 264a, respectively, for locking the pins 221, 231 and 241, respectively, when they are pushed inwardly. On the other hand, the cam slot 272 of the auxiliary lock plate 270 for receiving the pin 221 has a cam portion 272c in the same direction as the cam portion 262c of the lock plate 260, and the cam slot 273 for receiving the pin 231 therein has a cam portion 273c in the opposite direction to cam portion 272c. Accordingly, when the second operation lever 220 is pushed inwardly, the pin 221 makes the auxiliary lock plate 270 slide in the same direction as of the cam portions 261c to 264c of the lock plate 260. On the other hand, when the third operation lever 230 is pushed inwardly, the pin 231 makes the auxiliary lock plate 270 slide in the opposite direction, to wit, in a direction that the lock plate 260 is caused to slide by the cam portions 262b to 264b of the lock plate 270. The operation levers 210, 220, 230, 240 and 250 have elongated slots 213, 223, 233, 243 and 253, respectively, for guiding the sliding direction of the respective levers. The levers further have at their respective forward ends securing portions 214, 224, 234, 244 and 254, respectively, for securing operating members such as push buttons thereon.

A corner portion of the lock plate 260 has a connecting portion 269 having an elongated slot where a tip end of an actuating lever 163 is pivotally connected at 163a. The actuating lever 163 is pivotally supported intermediate the ends thereof on the main chassis 100 by a shaft 106 and connected at a base end thereof to a connecting member 164. The connecting member 164 is connected to a plunger rod 161 of the electromagnetic plunger 160 through an intermediate member 162. A power switch 165 for the plunger 160 is mounted on the main chassis 100. An operating member 166 for turning on or off the switch 165 is mounted on a securing portion 167 extending from the connecting member 164 of the actuating lever 163, and control the switch 165 in association with the operation of the lock plate 260 to operate the plunger 160. A relatively strong spring 121 is provided between the intermediate member 162 and the actuating lever 163, and a relatively weak spring is provided between the main chassis 100 and the actuating lever 163. Thus, the actuating lever 163 and the lock plate 260 are urged towards the interlocking member 90. The relatively strong spring 121 is adapted to be biased due to the cam portion 261c, 262c, 263c or 264c when each of the operating levers are depressed inwardly to operate the switch operating member 166. Thus, the spring 121 acts to smooth the operation irrespective of conditions of the plunger 160 energized.

In the aforementioned operation lever mechanism, it will be seen that when the second operation lever, namely, play-operation lever 220, is pushed inwardly, the pin 221 is caused to move within the cam slots 262 and 272 as can be seen from FIG. 11. Thus, the pin 221 acts on the cam portion 272c to move the auxiliary lock plate 270 upwardly as viewed in FIG. 11 and further acts on the cam portion 262c to displace the lock plate 260 upwardly. In such a course of the movement of the pin 221 within the cam slots 262 and 272, the operation lever 230 or 240, if it has been previously locked in the slot 263 or 264, is released and restored to its original position, and then the pin 221 acts on the cam portion 262b of the lock plate 260 to displace the lock plate 260 downwardly. Thus, the pin 221 is finally received in the recessed portion 262a and locked by a linear edge of the cam slot 272, which faces the cam portion 272c, so as to keep the pin 221 from disengaging therefrom. Similar operations are effected, when the third fast forward-operation lever 230 or the fourth rewind-operation lever 240 is pushed inwardly. The pin 231 or 241 first acts on the cam portion 263c or 264c to displace the lock plate 260 upwardly as viewed in FIG. 11, and then acts on the cam portion 263b or 264b to move the lock plate 260 downwardly, so that the pin 231 or 241 is locked in the recessed portion 263a or 264a. As to the auxiliary lock plate 270, substantially the same operations are effected irrespective of some differences in contours of the cam portions thereof. More specifically, when the third operation lever 230 is pushed inwardly, the pin 231 acts on the cam portion 273c of the auxiliary lock plate 270 to displace the plate 270 in a direction opposite to the case of the second operation lever 220. Accordingly, where the pin 221 of the second operation lever 220 has been previously locked by a recessed portion 262a, the auxiliary lock plate 270 is displaced to release the locking action by the action of the pin 231 on the cam portion 273c to restore the second operation lever to its original position. Furthermore, the cam portion 272c of the so displaced auxiliary lock plate 270 holds the second operation lever 220 in the restored position. Where the fourth operation lever 240 has been previously locked, the pin 231 acts on the cam portion 263c to release the pin 241 from the recessed portion 264a for restoring the lock plate 260 and to hold the pin 241 by the cam portion 264c. At the same time, the auxiliary pin 249 is also held by the cam portion 279. Thus, the depression of the operation levers 220 or 240 can be prevented. On the other hand, as to the fourth operation lever 240, the pin 241 and the auxiliary pin 249 are conjointly moved inwardly and the auxiliary pin 249 acts on the auxiliary lock plate 270 in a similar manner to the case of the pin 231. That is, the pin 249 acts to release and restore the second or the third operation lever 220 or 230, where it has been preliminarily locked. At the same time, the pin 221 or 231 of the so restored operation lever 220 or 230 is held by a cam portion 262c or 263c. Further, the lever 240 is also locked in the inwardly pushed position with the pin 241 received in the recessed portion 264a and the auxiliary pin 249 engaged with a linear edge 278 interior of the cam portion 279. In other words, though the auxiliary lock plate 270 has no cam slot corresponding to the cam slot 264, the auxiliary pin 249 cooperates with the cam portion 279 to act for the pin 231 of the third operation lever 230 and the cam portion 273c. Therefore, an operation similar to the case of the third operation lever 230 is attained. As to the fifth operation lever, namely, record-operation lever 250, the pin 251 is received in the channel-shaped slot 265 and allows the lock plate 260 to slide under any condition. The fifth record-operation lever 250 is provided with a mechanism for preventing inadvertent operation so that it is thrown into operative condition only when the tape is in a forward feed mode and a loaded tape is in a position to allow recording. The second operation lever 220 is for a play-operation and is adapted to advance or retreat the head plate 140 through the operating member 22. More particularly, when the operating member 22 is rotated within a limit of the arcuate slot 103, the head plate 140 on the main chassis 100 is advanced towards the cassette set in the recording/reproducing position to press the head 145 and the pinch rollers 141 against the tape for achieving a play mode. On the other hand, when the head plate 140 is retired, a play stop mode is established. It can be apparently seen from FIGS. 1 and 2 that such a play mode is established when the operation lever 220 is pushed inwardly.

When the first operation lever 210 is inwardly pushed independently of the interlocking member 90, namely, without engaging with the member 90, the play mode formed by the inward depression of the second operation lever 220 is released and a play stop mode is established. More particularly, when the operation lever 210 is pushed inwardly with the salient portion 212 thereof abutting against the engaging portion 191, the interlocking member 90 is pushed conjointly with the lever 210. However, if any one of the operation levers 220 to 240 is operated, the pin 221, 231 or 241 acts on the cam portion 262b, 263b or 264b at a final step of the retreating course to displace the lock plate 260 towards the interlocking plate 90. Upon displacement of the lock plate 260, the engaging portion 267 displaces, through the pin 192, the engaging portion 191 of the interlocking member 90 outwardly so that the salient portion 212 of the lever 210 does not contact the engaging portion 191. When the first operation lever 210 is pushed inwardly under such conditions, the lever 210 is moved without engaging with the interlocking member 90. At this time, the pin 211 acts on the cam portion 261c to slide the lock plate 260 in the opposite direction to that of the cam portions 262b etc., releasing the pins 221 etc. from the recessed portions 262a. Thus, the play stop mode is established. Where the interlocking member 90 is pushed conjointly, the hook portion 99 formed at the rear end of the interlocking member 90 operates to effect cassette ejection. As can be understood, in this case, none of the second to fourth operation levers are depressed. If any one of the second to fourth operation levers are depressed, the salient portion 212 does not engage with the engaging portion 191 as mentioned above. Accordingly, where the interlocking member 90 is allowed to move conjointly with the first operation member 210, the play stop mode is not formed but the cassette ejection is carried out. The mechanism for carrying out the cassette ejection comprises means pulling up the tape pack from the lowered set position on the main chassis 100 to an appropriate height and then projecting the tape back out of the loading opening. Various mechanisms have been proposed and put into a practical use for carrying out the cassette ejection, and any known mechanism may be employed in the magnetic tape recording/reproducing apparatus of the present invention.

In the aforementioned arrangement according to the invention, the lock plate 260 is connected to the electromagnetic plunger 160 through the actuating lever 163, and the actuating lever 163 opens or closes the power switch 165 through the operating member 166 carried by the securing member 167. More specifically, when the lock plate 260 is displaced by the action of the pin 221, 231 or 241 on the cam portion 262b, 263b or 264b, so as to release the interlocking member 90 from the first operation lever 210, the power switch 165 is closed and the electromagnetic plunger 160 is energized to attract the rod 161. Thus, the depressed condition of any of the second to fourth operation levers are positively held. The electromagnetic plunger 160 is not required to have more than attracting force, and there is no need to provide a complicated circuit required for imparting both an attracting force and a drawing force. On the other hand, when the pin 211, 221, 231 or 241 acts on the cam portion 261c, 262c, 263c or 264c, the power switch 165 is opened by the operating member 166 and the attraction by the electromagnetic plunger 160 is released. Where any of the second to fourth operation levers 220, 230 and 240 is pushed inwardly, the power switch 165 is once opened and then closed by the action of the cam portion 262b, 263b or 264b. However, where the first operation lever 210 is pushed inwardly, the power switch 165 is kept opened because the cam slot 261 has only the cam portion 261c and has no cam portion corresponding to 262b etc. Therefore, the tape feed attained by any one of the second to fourth operation levers 220 to 240 is stopped and the aforesaid play stop mode is established. Thus, a double lock operation is achieved by employing the electromagnetic plunger 160. Furthermore, the desired locking action is attained upon actuation of any one of the operation levers to prevent inadvertent operation, such as double depression, and operation modes are switched directly from one mode to another mode without putting the apparatus once into stop mode. In this connection, it is to be noted that since the recessed portion 262a, 263a or 264a operative for locking is so adapted as to be easily released, the mechanism or spring for effecting release of the locking or restoration of the associated operating lever is not required to be strong. Accordingly, the mechanism for effecting such release or restoration can be simplified and the loads applied to the respective operating levers can be reduced.

In accordance with the arrangement as mentioned above, when any one of the operating levers 220, 230 and 240 is depressed, the corresponding pin 221, 231 or 241 acts on the cam portion 262b, 263b, or 264b of the cam slot 262, 263 or 264 of the lock plate 260 to slide the lock plate 260 in a direction to displace the pin 192 of the interlocking member 90. As a result, the engagement between the salient portion 212 of the first operating lever 210 and the engaging portion 191 of the interlocking member 90 is released. In this case, when the first operation lever 210 is depressed, the lever 210 is retired without engaging with the interlocking member 90, so that the play stop mode as mentioned above is established without removing the cassette from the recording/reproducing position. On the other hand, when no operation levers are depressed, there no action takes place between the cam portion 262b, 263b or 264b and the pin 221, 231 or 241, so that the interlocking member 90 is located in a position as illustrated in FIG. 11. Therefore, upon depression of the first operating lever 210, the interlocking member 90 is pushed inwardly together with the lever 210 to perform the cassette ejecting operation. Thus, two modes of operation can be effected by a single operation lever. More particularly, the play stop mode, where the play operation is suspended with the cassette being kept in the recording/reproducing position, can be attained by the eject-operation lever. It will then be appreciated that the movement of the cassette to an unstable condition where it projects from the cassette loading opening as mentioned above is avoided unless ejection thereof is desired and further play after the temporary play stop can be easily attained. In addition, since the operation lever performs a number of functions, the entire structure of the apparatus is simplified.

Figure 13:
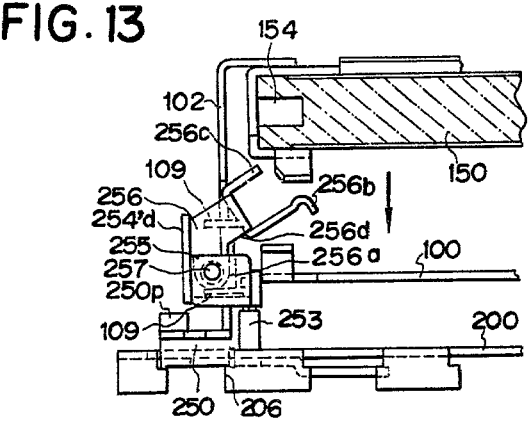
FIG. 13 is a side elevational view of a cassette detecting mechanism.
Figure 14:
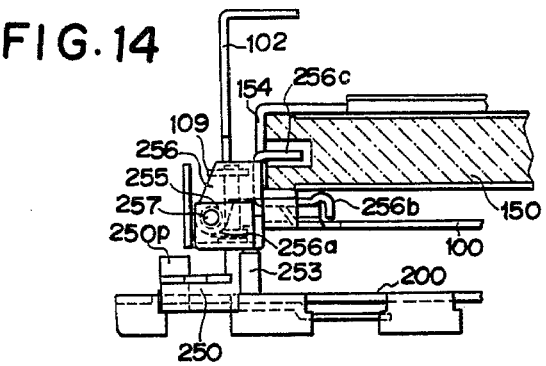
FIG. 14 is a side elevational view of the mechanism shown in FIG. 13 showing the operation thereof for a cassette with a tape having record thereon.
Figure 15:
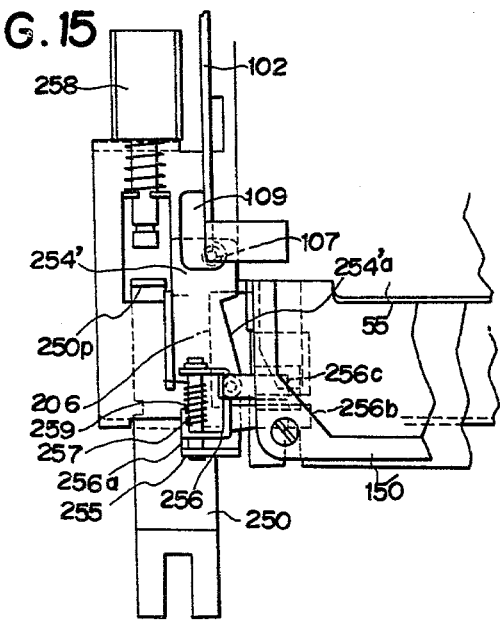
FIG. 15 is a plan view of the mechanism shown in FIG. 14.
Figure 16:
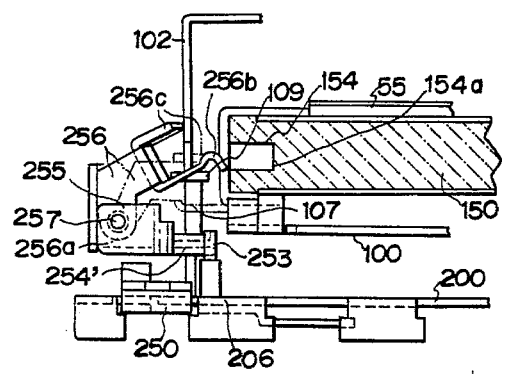
FIG. 16 is a side elevational view of the mechanism shown in FIG. 13 showing the operation thereof for a cassette with a tape having no record thereon.

A further preferred form of the magnetic tape recording/reproducing apparatus of the invention has a mechanism for preventing inadvertent recording as illustrated in FIG. 10 and FIGS. 13 to 17. The record-operation lever 250 is supported on the rewind-operation lever 240 as mentioned before and is adapted to slide on the baseplate 200 through the engagement between a pin provided on the baseplate 200 and the elongated slot 251. The spring 250s is provided between a hook formed on the lever 250 and the baseplate 200 for resetting the lever 250 into its original position. The record-operation lever 250 further has an operating portion 250p formed at a side portion thereof so as to project from the lever 250. When the lever 250 is pushed inwardly, the operating portion 250p operates a record switch 258 for effecting a recording operation. A lock pin 253 is provided on the record-operation lever 250 at a forward portion thereof and projecting upwardly from the base plate 200 through an elongated slot 206 formed thereon. A lock plate 254' (FIG. 15) is provided on the base plate 200 so as to rotate in a plane parallel to baseplate 200 around a pivotal shaft 107 carried by supports 109, 109 of the sidewall 102. A pivotal seat 255 is provided in front of the lock plate 254. A detecting lever 256 is provided on the pivotal seat 255 so as to rotate in a direction perpendicular to the base plate 200 around a pivotal shaft 257 parallel with the plane of the baseplate 200. The detecting lever 256 has, as illustrated in FIGS. 13, 14 and 16, a portion 256b for contacting a lower face of the cassette 150 extending from a pivotal portion 256a and a portion 256c for contacting a side of the cassette 150. In other words, a major face of the pivotal portion 256a and these portions 256b and 256c forms a channel-shape. The portion 256b for contacting the lower base of the cassette 150 is longer than the portion 256c for contacting the side of the cassette 150 as depicted in the figures. A resetting spring 259 is provided to the shaft 257 to normally urge the detecting lever 256 to assume a tiltingly raised position as illustrated in FIG. 15. A free end of the lock plate 254 has a lock portion 254a and has a spring which normally urges the free end towards the lock pin 253.

Figure 17:
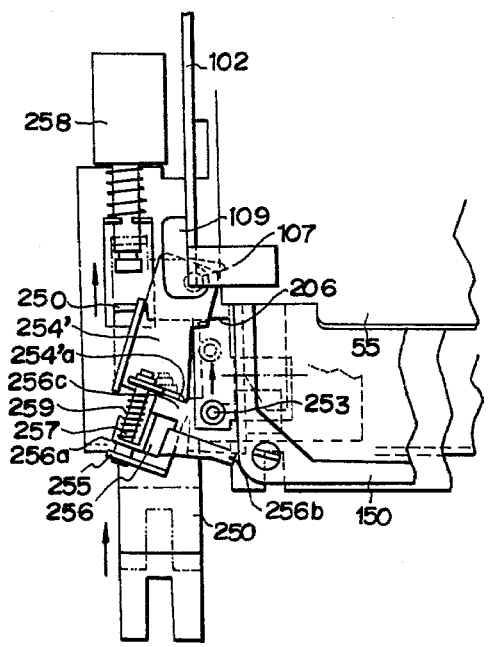
FIG. 17 is a plan view of the mechanism shown in FIG. 16.

In the arrangement of the record-operation lever mechanism, it will be seen that when the cassette loading frame 55 is lowered to the recording/reproducing position on the main chassis 100 by the swingable member 50, the portion 256b is brought into engagement with the lower face of the cassette 150, so that the detecting lever 256, which has been held in a tilted raised position by a sidewall portion 254'd of the lock plate 254' and a slanting portion 256d of the detecting lever 256, is rotated around the shaft 257. When a lug 154a of a detecting portion 154 of the cassette 150 is to indicate that a record has been made on the tape in the cassette, the portion 256c enters the detecting portion 154, as illustrated in FIGS. 14 and 15, so that the detecting lever 256 is rotated to a horizontal position as illustrated in FIG. 15, while the lock plate 254' is not actuated, which keeps the lock pin 253 locked by the lock portion 254'a thereof. With the lock pin 253 locked by the lock plate 254' as mentioned above the record-operation lever 250 cannot be pushed inwardly and accordingly a recording cannot be carried out. On the other hand, where the lug 154a is not removed, the portion 256c abuts against the lug 154a as illustrated in FIGS. 16 and 17 and cannot enter the detecting portion 154. When the cassette 150 is lowered under these conditions, the lock plate 254' is displaced outwardly around the shaft 107. Upon the rotation of the lock plate 254', the lock pin 253 is released from the lock portion 254'a, throwing the record-operation lever 250 into an operative position. The positional relation between the components to attain the release of the lock pin 253 is illustrated by a solid line and a phantom line in FIGS. 16 and 17. In case the action of the spring 259 is stronger than that of the spring of the lock portion 254'a, the lock plate 254' is displaced so that the portion 256 is disengaged from the lower face of the cassette 150 and abuts against the lug 154a as illustrated by a solid line in FIGS. 16 and 17. On the other hand, where the action of the spring 259 is relatively weak, the lock plate 254' assumes a position as illustrated by a phantom line where the portion 256b is in contact with the lower face of the cassette 150 and the portion 256c is in contact with the lug 154a. In either case as mentioned above, the lock pin 253 is released.

Figure 18:
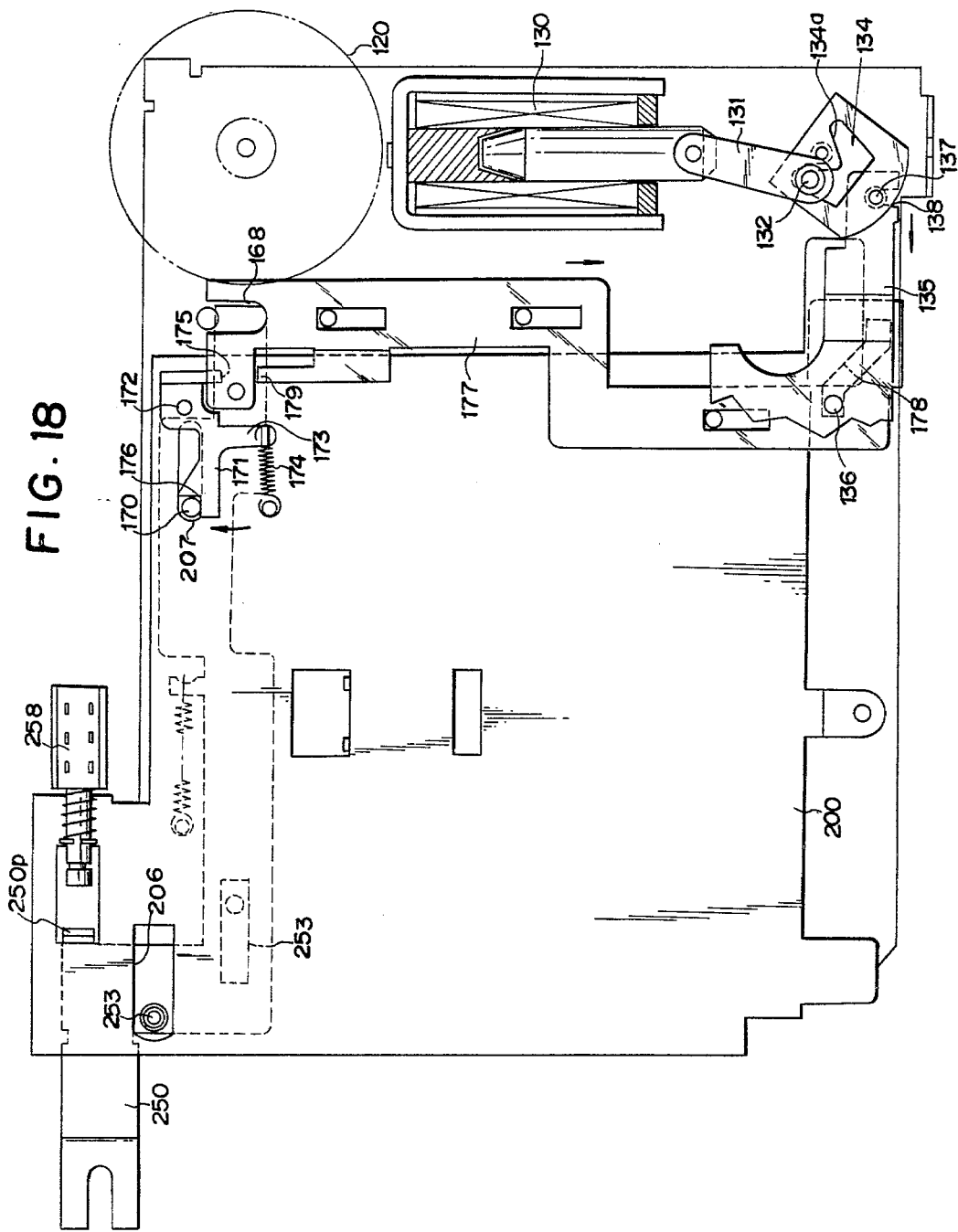
FIG. 18 is an explanatory view of a mechanism for preventing inadvertent operation employed in the apparatus of this invention, showing the operation thereof in a forward tape feed mode.
Figure 19:
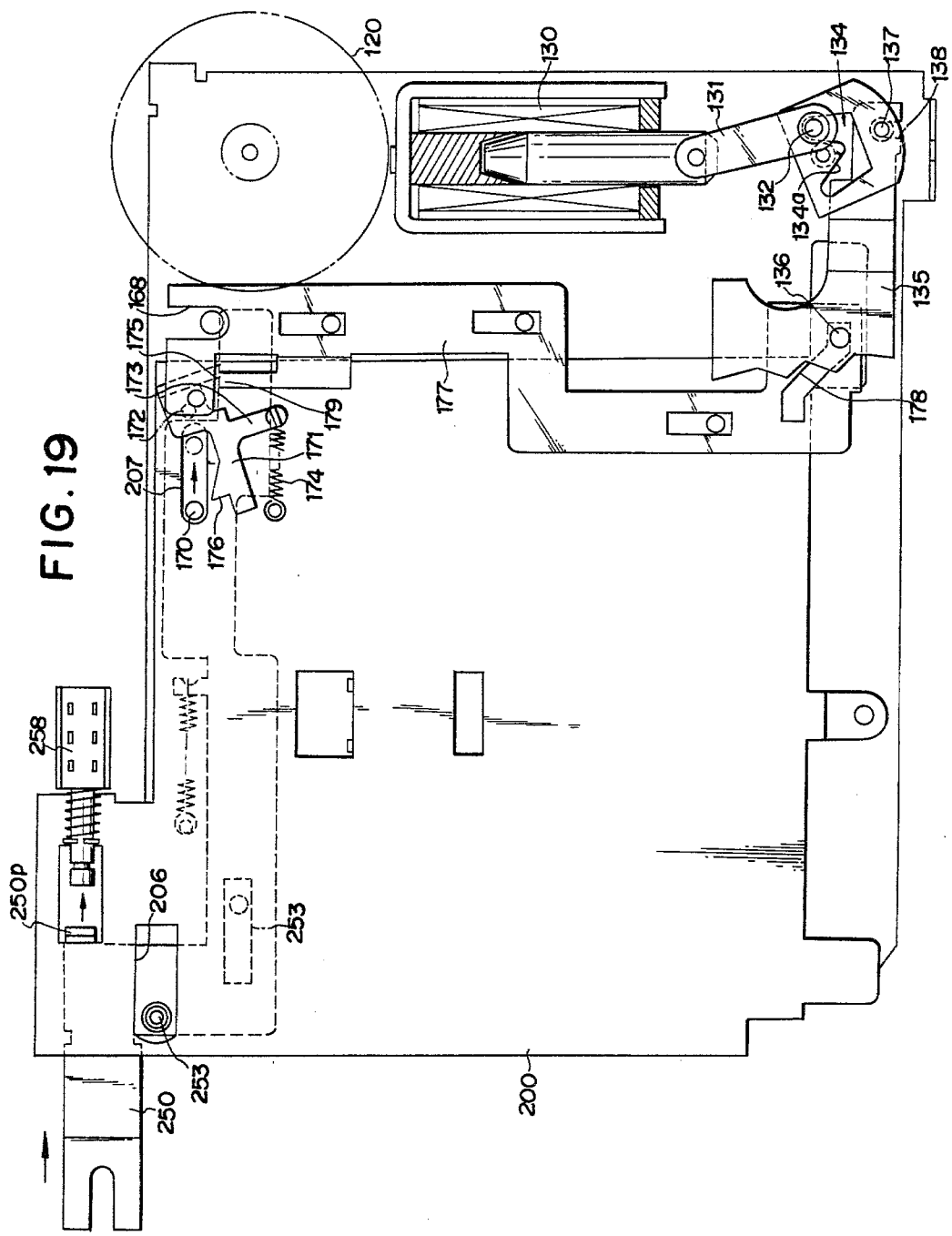
FIG. 19 is a similar view showing the operation in a reverse tape feed mode.

The magnetic tape recording/reproducing apparatus of the invention is further provided with a mechanism for preventing inadvertent recording in the reverse tape feed mode as illustrated in FIGS. 18 and 19. The components provided in association with the baseplate 200 is as shown in FIG. 10. The record-operation lever 250 has a guide pin 170 fixed thereto. The guide pin 170 projects from the baseplate 200 through an elongated slot 207 thereof. On the baseplate 200 is rotatably mounted about a pivot pin 172 an engaging member 171. An engaging portion 176 is formed at a tip end portion of the engaging member 171 and an arm portion 173 is formed intermediate the ends thereof. A tension spring 174 is provided between the arm portion 173 and the baseplate 200 to urge the engaging member 171 so as to rotate the same towards the pin 170 projecting from the slot 207. The engaging member 171 has a passive portion 175 formed at a tail portion thereof which is lifted by the baseplate 200. A changeover plate 177 is also mounted on the base plate so as to extend in a direction perpendicular to the record-operation lever 250. A cam slot 178 is formed at a base end portion of the changeover plate 177 and is engaged with a pin 136 extending downwardly from a pinch roller operating plate 135 which is adatped to be actuated by the electromagnetic plunger 130. The changeover plate 177 has a pause-operation portion 169 and an idler-operating portion 168 as well as a projection 179 for operating the passive portion 175. The changeover operation of the operating plate 135 by the electromagnetic plunger 130 is carried out by a mechanism including an operating member 131 connected to the plunger rod of the plunger 130. The member 131 has a pin 132 which is engaged with a cam slot 134 having an angular cam portion 134a formed in a cam member 133 pivotally supported on the main chassis 100. The cam member 133 has a pin 137 engaged with an elongated slot 138 of the operating plate 135. The operating plate 135 is caused to move to and fro in a longitudinal direction thereof according to a rocking movement of the cam member 133. In addition, a cam portion 139 formed on the operating plate 135 displaces one of the pinch rollers 141, 141 mounted on the head plate 140 alternatingly, to press the same against a capstan 148 so as to establish the forward tape feed mode and the reverse tape feed mode alternatingly.

In the arrangement as mentioned above, the pinch roller operating plate 135 is subjected to changeover operation by the operation of the electromagnetic plunger 130, and the changeover plate 177 is, in turn, operated upon the operation of the operating plate 135. In the arrangement as illustrated, only when the pinch roller 135 is displaced forwardly, or, when the apparatus is in the forward tape feed mode, the projection 179 pushes the passive portion 175 of the engaging member 171 as illustrated in FIG. 18 to release the engagement of the engaging portion 176 of the engaging member 171 with the pin 170. Thus, a recording operation by the lever 250 is enabled only in such a forward tape feed mode. On the other hand, in the reverse tape feed mode, the lever 250 is held in a locked position, as illustrated in FIG. 19. In addition, according to the arrangement as disclosed herein, recording is effected only when two conditions are satisfied. More specifically, recording is enabled when the apparatus is in the forward tape feed mode and when it is confirmed that the tape is in a position to allow recording by the detecting means as mentioned above. Thus, inadvertent recording is positively prevented.

In this connection, it is to be noted that the mechanism for preventing inadvertent recording as disclosed is specifically adapted for an automatic reversing tape recording/reproducing apparatus to enable recording only when the apparatus is in the forward feed mode and completely to prevent inadvertent recording when the apparatus is in the reverse feed mode. It is further to be noted that the mechanism utilizes operating plates provided for pause-operation, idler operation, etc. and is comprised of a relatively small-sized member, such as an engaging member 171.

Figure 20:
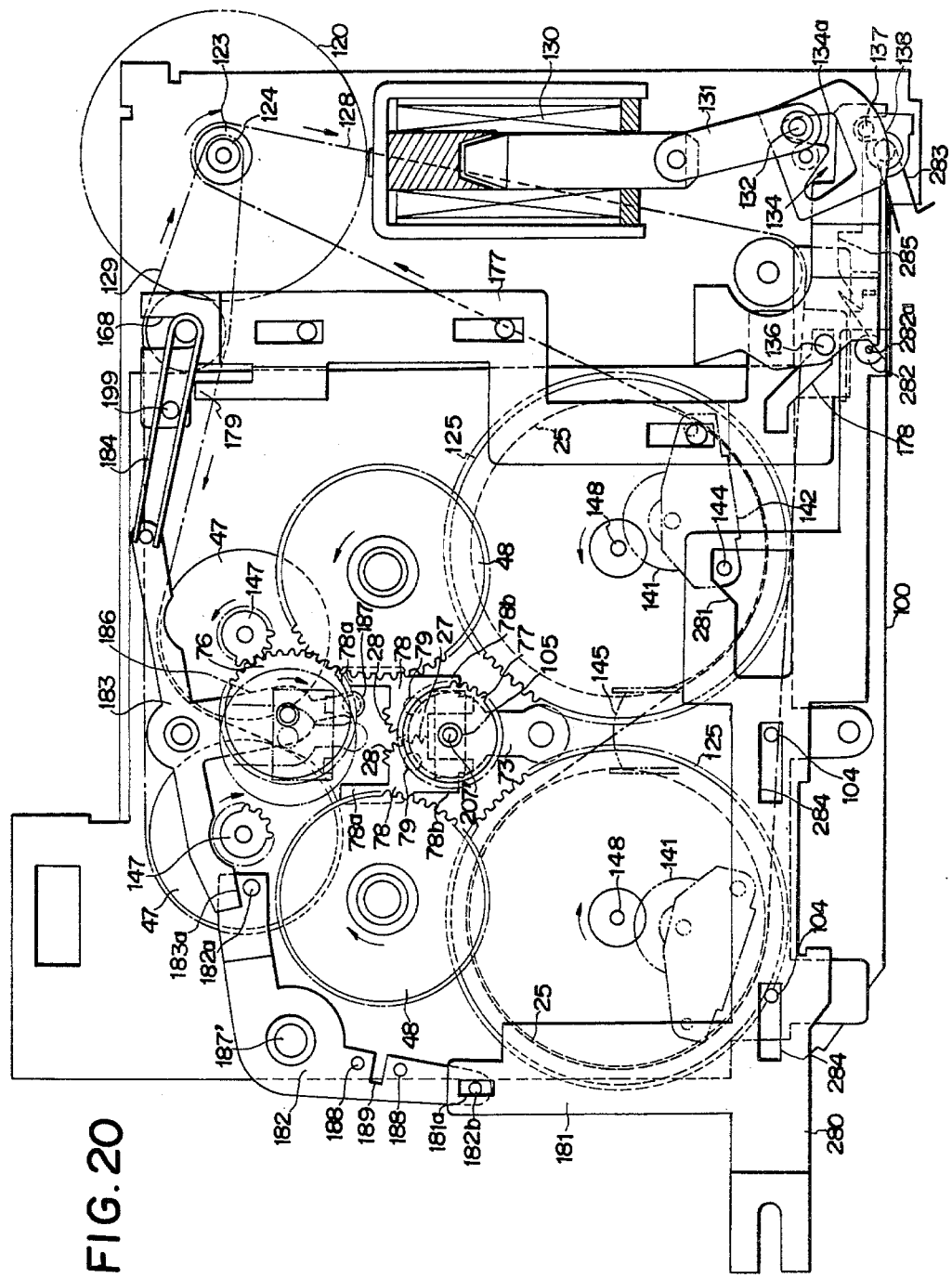
FIG. 20 is an explanatory plan view of a mechanism for switching over idlers employed in the apparatus of the invention.

In a further preferred form of the magnetic tape recording/reproducing apparatus of this invention, there is suitably employed an idler switch-over mechanism for fast-forward/rewind operation as illustrated in FIG. 20.

Generally, to carry out the fast-forward/rewind operation in a magnetic tape recording/reproducing apparatus, it is necessary to changeover the operational relation between the components established for the normal tape feed. Accordingly, there have been proposed various methods to carry out the changeover operation. However, the mechanisms proposed and put into a practical use heretofore are generally of large-sized which require a relatively large force, and have a disadvantage that the entire mechanisms are inevitably bulky. More particularly, to attain the fast-forward/rewind operation, it is necessary to switch over an interlocking member, such as an idler in interlocking systems, to establish or cancel the interlocking relation in the systems. Furthermore, in these mechanisms, opposite interlocking systems, such as a fast forward mode system and a rewind mode, and a forward feed mode and a reverse feed mode systems are required, and accordingly, it is required that a desired switching operation of the idler be attained under any mode. The mechanism capable of attaining desired idler operation under any condition of the interlocking systems inevitably are complicated in structure and large in size.

The idler switch-over mechanism employed in the magnetic tape recording/reproducing apparatus of this invention can perform such an idler switch-over operation to establish any desired interlocking system with a compact and simple structure.

Figure 21:
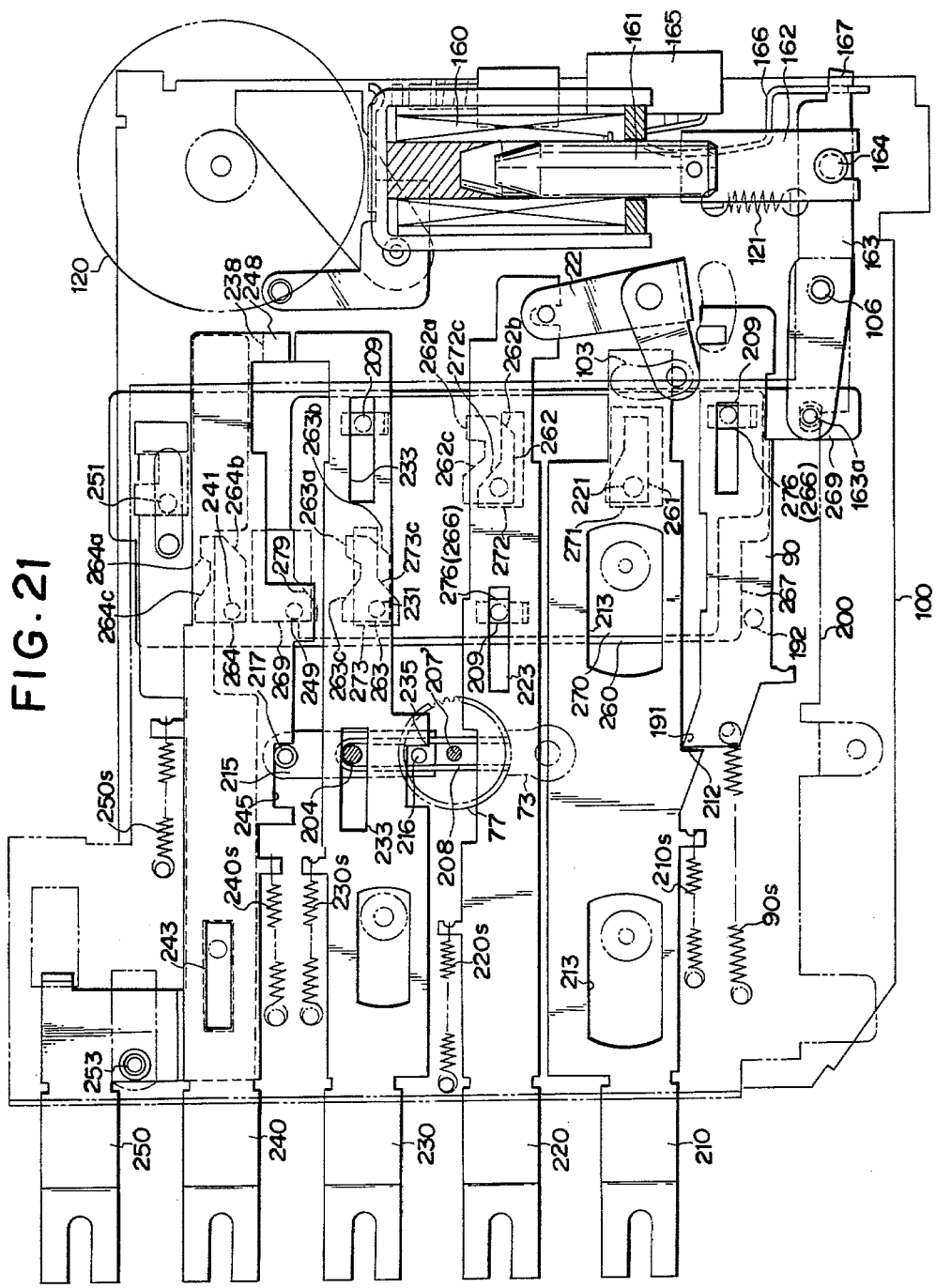
FIG. 21 is a plan view of operation levers in association with the mechanism shown in FIG. 20.

As illustrated in FIG. 20, a motor 120 has two pulleys 123, 124. A belt 128 is provided between the pulley 123 and two flywheels 25, 25 as illustrated, and another belt 129 is provided between the pulley 124 and two play pulleys 47, 47 as illustrated. Each of the flywheels 25, 25 has a flywheel gear 125 formed integrally therewith, and each of the pulleys 47, 47 has a small gear 147 coaxial therewith. Reel base gears 48, 48 are provided between the flywheels 25, 25 and the pulleys 47, 47. A first idler 76 is interposed between the small gear 147 and the reel base gear 48 and a second idler 77 is interposed between the flywheel gear 125 and the reel base gear 48. The first idler 76 is rotatably carried by an arm 186 formed intermediate an interlocking lever 183 pivotally supported intermediate the ends thereof. The second idler 77 is rotatably carried at a free end of a link 73 which is pivotally supported at a base end thereof on the main chassis 100. The arm 186 and the link 73 have end portions having operating projections 187 and 27, respectively. The operating projections 187 and 27 project from the arm 186 and the link 73, respectively, so as to confront each other. Between these operating projections 187 and 27, two seesaw members 78, 78 pivotally supported intermediate thereof, respectively, are disposed symmetrically. The seesaw members 78, 78 have semicircular gears 28, 28 around the pivotal points thereof, respectively, which are in mesh with each other. The seesaw members 78, 78 have extensions 78a, 78a, respectively, between which the operating projection 187 is positioned, and have extensions 78b, 78b, respectively, between which the operating projection 27 is positioned as illustrated in FIG. 20. A shaft carrying the idler gear 77 extends downwardly through the baseplate 200 to form an operating portion 207'. A spring member 208 formed in a U-shape as illustrated in FIG. 21 is fitted at free end portions thereof to the operating portion 207'. A base end of the resilient member 208 is secured to a rotating member 215 mounted intermediate thereof on the baseplate 200 by a shaft 204, using the shaft 204 and a projection 216 provided at an end portion of the rotating member 215. The rotating member 215 has another projection 217 at the opposite end portion thereof. The projections 216 and 217 are engaged with a recessed portion 235 of the fast forwardoperation lever 230 and a recessed portion 245 of the rewindoperation lever 240, respectively. When the operation lever 230 or 240 is depressed, the rotating member 215 is rotated. In this connection, it is to be noted that since the projections 216 and 217 are disposed on the opposite positions to each other with respect to the pivot 204, the directions of the rotations caused by the depressions of the levers 230 and 240 are opposite each other.

Figure 22:
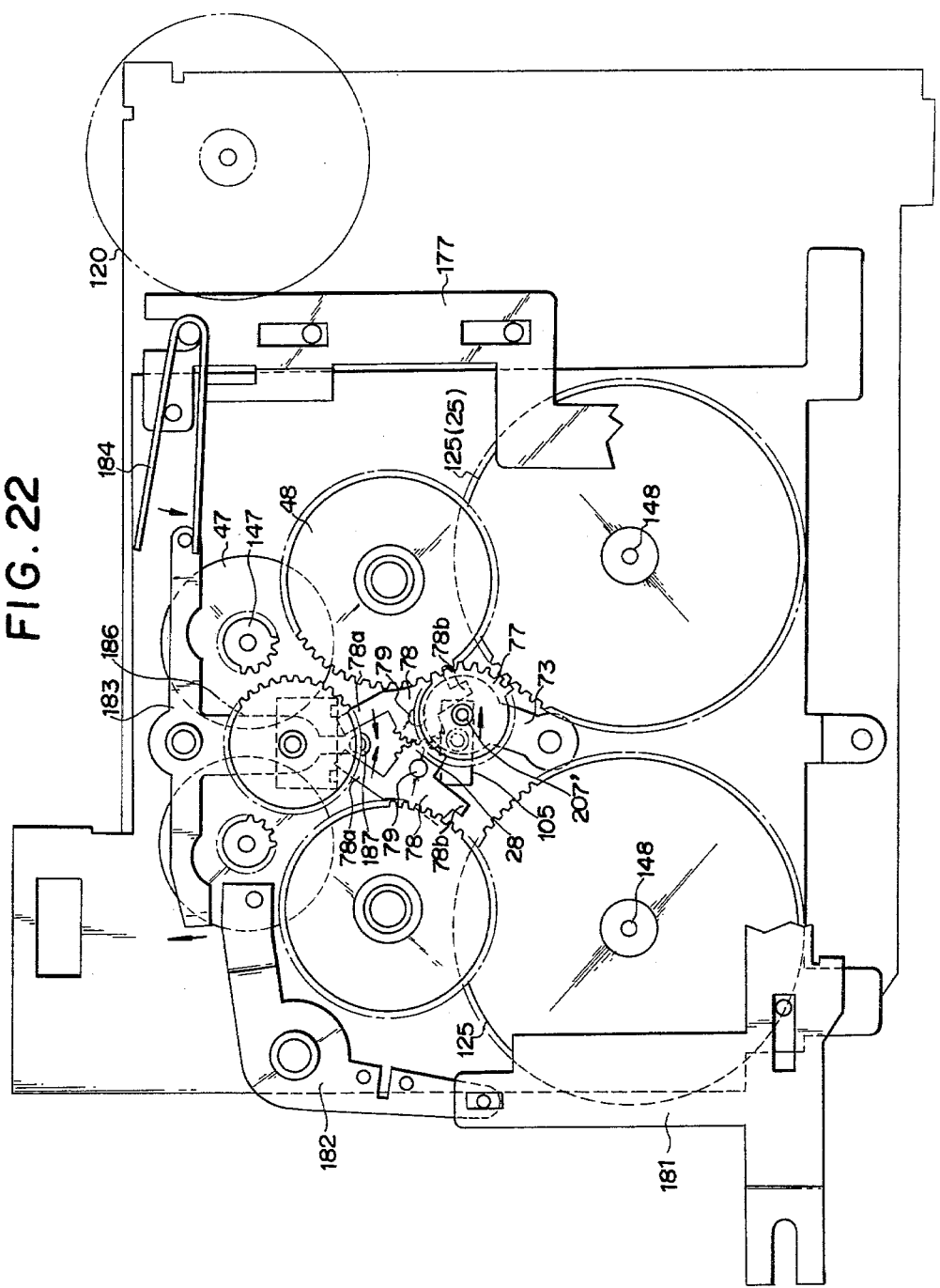
FIG. 22 is an explanatory plan view showing a state where a play idler is disengaged.

When the interlocking lever 183 is in a tilted position as illustrated or in a tilted position in the opposite direction, the idler 76 is in mesh with either one of the small gears 147, 147 driven by the belt 129 and the reel base gear 48 associated therewith to feed the tape in a forward mode or a reverse mode for playing. During the play operation, the operating projection 187 acts on the extension 78a of either one of the seesaw members 78, 78 and the other seesaw member 78 is interlocked through the meshing between the semicircular gears 28, 28 as illustrated in FIG. 20. Therefore, the idler 77 located between the extensions 78b, 78b are held in a neutral position. When the fast forward-operation lever 230 or the rewind-operation lever 240 is depressed during the playing operation under these conditions, the rotating member 215 is tilted by the recessed portion 235 or 245 to bring the idler 77 into mesh with either one of the flywheel gears 125 and either one of the reel base gears 48 for attaining the fast-forward mode or the rewind mode. At this time, since the operating portion 207' of the shaft of the idler 77 is displaced to the extremity of an elongated slot 105 of the main chassis 100, the extension 78b of either one of the seesaw members 78 is displaced outwardly and the other seesaw member 78 is conjointly tilted as illustrated in FIG. 22. Accordingly, the play-idler 76 which has been in mesh with the reel base gear 48 and the small gear 147 is disengaged therefrom by either one of the extensions 78a, 78a to surely establish the fast-forward mode or the rewind mode.

Although the arrangement of the mechanism as mentioned above is used in combination with the fast forward-operation lever 230 and the rewind-operation lever provided separately from each other, the invention is also applicable to such an operation lever mechanism as comprised of a single lever having operation portions at the opposite sides thereof and pivotally supported at a central portion thereof on the apparatus frame and operation members adapted to advance and retreat upon pivotal movement of the operation lever. In this case, for example, the link 73 may be formed of a T-shaped member like the interlocking lever 183 so that an idler like the indler 77 may be supported thereon at its projected portion and the opposite side end portions thereof are adapted to act on the operation members as mentioned above.

In accordance with the arrangement of the idler switching mechanism of the invention as mentioned above, a desired mode can be surely attained by switching the play idler whether the tape is being fed in the forward mode or in the reverse mode and whether the desired mode to be attained in the state is the fast forward mode or the rewind mode. Furthermore, the mechanism can be simplified by using a pair of seesaw members 78, 78 each having a semicircular gear 28.

Further, as to means for effecting a pause operation in a magnetic tape recording/reproducing apparatus, there have been proposed various arrangements which are classified into an electrical type and a mechanical type. In case of the mechanical type arrangement, it is very difficult to carry out a well-timed pause operation for a play idler inserted in a drive system associated with reel bases and pinch rollers to be pressed against capstans. The pause operation, if mistimed, will cause defection of a tape or undesired fast forward tape feeding. Therefore, the invention further contemplates a mechanism for a pause operation which can easily and surely effect a well timed pause operation by employing a specific adjustable mechanism.

As illustrated in FIG. 20, a pause-operation lever 280 is disposed on the baseplate 200 in parallel with the other operation levers 210 to 250 as mentioned above. The interlocking lever 183 is interlocked with the pause-operation lever 280 through an L-shaped lever 182 connected to an arm portion 181 of the lever 280. The pause-operation lever 280 has elongated slots 284, 284 engaged with guide pins 104, 104 provided on the main chassis 100 and is adapted to be depressed in the longitudinal direction thereof like the other operation levers 210 to 250. The lever 280 has a cam slot 281 with which a roller 144 of the pinch roller frame 142 for feeding the tape in a forward mode is engaged, so that the pinch roller 141 is disengaged from the capstan 148 upon depression of the lever 280. The lever 280 further has an engaging member 282 at a rear end portion thereof. A lock member 285 adapted to rotate by the action of a resilient member 283 provided between the main chassis 100 and the lock member 285 is disposed so as to confront the engaging member 282. The engaging member 282 has a projected portion 282a which is engageable with the lock member 285. Therefore, the lever 280 is adapted to be locked in a retired position upon first depression of the lever 280 as illustrated in FIG. 23, and is adapted to be disengaged from the lock plate 285 to be restored as illustrated in FIG. 20 upon further depression of the lever 280. The connection between the arm portion 181 and one end of the L-shaped lever 182 is attained by an elongated slot 181a and a pin 182b as illustrated in the figures. On the other hand, another end of the L-shaped lever 182 and the interlocking lever 183 are connected to each other through an engagement between an engaging portion 183a and a pin 182a. More specifically, the interlocking lever 183 is normally urged to rotate counterclockwise as viewed in FIG. 20 by the action of a U-shaped resilient member 184 which is adapted to act on the opposite end of the interlocking lever 183. The L-shaped lever 182 is supported at a corner thereof on the main chassis 100 by a pivot 187' and has adjusting means at the arm portion 181. The adjusting means is comprised of a notch 189 and pins 188 on the opposite sides thereof and adjusts an angle defined by the pins 182a and 182b around the pivot 187' and a relative length therebetween.

The tape feed direction changeover plate 177 is adapted to be actuated by the electromagnetic plunger 130 as mentioned before and carries the resilient member 184 at a tip end thereof. Upon rotation of the resilient member 184 around the pivot 199, the interlocking lever 183 is actuated to seesaw. As a result, the meshing relations between the idler 76 and the gears 47 and 48 are switched to change over the tape feed directions.

In accordance with the arrangement as mentioned above, since the adjusting portion comprised of the notch 189 and the pins 188, 188 are formed in the interlocking system operable by the pause-operation lever 280, the length and angle of the lever 182 can be adjusted by applying a tool to the projections 188, 188 after a series of operation systems are mounted. Accordingly, the operation timing of the pause-operation lever 280 with respect to the pinch roller 141 in the cam slot 281 and with respect to the play idler 76 in relation to the gear 147 and the reel base gear 48 can be effectively adjusted to timely carry out the pause operation. The arrangement is applicable to a magnetic tape recording-/reproducing apparatus in which two independent drive systems, namely, flywheel drive system and play drive system, are provided, to achieve effective adjustment for attaining a desirably timed pause operation.

We claim:

1. In a magnetic tape cassette recording/reproducing apparatus, said apparatus including a cassette-receiving frame movable from a cassette-receiving position to a cassette recording/reproducing position; first slide means; spring means urging said first slide means into an initial first position; said first slide means having a cassette abutment portion engageable by the cassette being inserted into said cassette-receiving frame when the first slide means is moved into a second position against the return force of the spring means as the user pushes the cassette into the apparatus; locking means for automatically locking said first slide means into said second position when the first slide means reaches the same; cassette-receiving frame moving means for effecting the movement of said cassette-receiving frame from said cassette-receiving position to at least a given second position preparatory to a recording/reproducing operation when said first slide means is moved into said second position where it is locked by said locking means; the improvement for facilitating the easier movement of said cassette against the return force of the spring means operating on said first slide means comprising swaying means positioned to be swayed in first and second directions with movement of said first slide means respectively toward and away from said second position, said swaying means being provided with at least one operating portion; pivotable floating means having opposite end portions provided with projections, respectively, an intermediate side of said floating means confronting said operating portion of the swaying means, and a pair of engaging means for respectively engaging and disengaging said projections of the floating means as the floating means is moved by said swaying means, spring means for urging one of said engaging means in a first direction said floating means having a cam surface with first and second portions respectively engaged in succession by said operating portion of the swaying means which portion when the swaying means is moved in said first direction as the first slide means moves toward said second position pivots said floating means in a given direction, one of the projections of said floating means then being held by the other of said engaging means which projection forms a pivot point for the floating means while the other projection moves sad one engaging means initially against the spring return force of the spring means operating thereon during the engagement of said operating portion with said first cam surface portion, the force of said other projection on said other engaging means being relieved as said operating portion thereafter engages said second cam surface portion so that the latter spring means aids the further movement of said first slide means toward said second position.

2. The apparatus of claim 1 wherein said cassette-receiving frame moving means includes second slide means, spring means urging said second slide means into a given second position, said locking means locking said second slide means in a first position against the return spring force on said second slide means, said locking means releasing said second slide means when said first slide means reaches said second position, said released second slide means moving said cassette-receiving frame at least to said second given position, and there is provided manually operable cassette ejecting means including means for returning the unlocked second slide means to said second position where it is locked by said first locking means in said second position, the return of said second slide means to said first position effecting the return of said cassette-receiving frame to said cassette-receiving position, said locking means then releasing said first slide means for movement toward said initial position, the release of said first slide means from said second locked position bringing said cassette abutment portion against said cassette to push the cassette to a cassette-ejected position where it can be manually removed from the apparatus.

3. The apparatus of claim 1 or 2 wherein said cassette-receiving frame is arranged to receive said cassette oriented and moved into the same in a substantially horizontal plane, said initial and second positions of said frame being respectively parallel raised and lowered position thereof, said cassette-receiving frame moving means including a member initially positioned above said frame and pivotable downward with respect thereto and upon the same to move said frame into said lowered position, and said released second slide means as it moves from said second position pivoting said pivotable member down upon said frame to lower the same.

4. The apparatus according to claim 2 which further comprises manually operable play operating means; a magnetic head; means for advancing said magnetic head to a playing position upon operation of said play operating means; interlocking means having an engaging portion normally in the path of movement of said ejecting means to effect a cassette ejecting operation and movable out of the path of movement of said ejecting means, releasable holding means for holding said play operating means in its operated state, said holding means including second locking means having a first portion engaged by a portion of said play operating means when moved to its operated state to displace the second locking means towards the interlocking means to move said interlocking means into a position out of the path of movement of said ejecting means so that operation of said ejecting means will not effect a cassette-ejecting operation, and means responsive to each operation of said ejecting means for releasing said play operating means from said operated state if previously operated thereto.

5. An apparatus of claim 4, which further comprises: an electromagnetic plunger; a power switch for said electromagnetic plunger; operating means including said second locking means coupling said play operating means to said plunger and said power switch so that upon operation of the play operating means the plunger is moved into a given position and the power switch is operated to energize the electromagnetic plunger to hold it in said given position and to hold said second locking means in a position where said second locking means holds said play operating means in its operated state, said operating means including a member for operating said power switch, an actuating member connected to said second locking means and said electromagnetic plunger and interlocked with said member for operating the power switch, means formed on said second locking means for actuating said member for operating the power switch to turn the switch on through said actuating member, and means formed on said second locking means for operating said power switch to turn the switch off when said ejecting means is operated.

6. The apparatus of claim 4, which further comprises: manually operable record-operating means for effecting a recording operation on said cassette; a pinch roller for engaging the tape in the cassette for feeding the same; a pinch roller operating means for changing the tape feed direction of the tape in the cassette by changing the pinch roller rotation direction; changeover means interlocked with said pinch roller operating means; lock means provided on the record-operating means; an engaging member engageable with said lock means which locks the second-operating means in its operated state; and means for engaging said changeover means with said engaging member to release said engaging member from said lock means only when the tape feed attained by said pinch roller operating means is in a forward direction.

7. An apparatus of claim 1, which further comprises:
a pair of reel bases on which the tape cassette is mounted;
a pair of play-drive rotating members;
a pair of reel base rotating members;
a first idler adapted to be interposed between the play-drive rotating member and the reel base rotating member and to mesh therewith for a play-tape feed in a forward direction or in a reverse direction;
a first support member for supporting said first idler;
a second idler adapted to be interposed between said reel base rotating member and the other play-drive rotating member;
a second support member for supporting said second idler;
arcuate interlocking members interposed between respective ends of the first and the second support member;
a pair of seesaw operating members in mesh with each other through said arcuate interlocking members; and
means for operating one of said seesaw operating members to throw either one of said first and second idlers into mesh with the rotating members, while operating the other seesaw operating member conjointly to release the other idler from meshed position.

8. An apparatus of claim 1, which further comprises:
a pair of capstans;
a pair of pinch rollers;
a pair of reel bases;
a pair of drive rotating members;
an idler;
means for pressing the pinch roller against the capstan while throwing the idler into mesh with the reel base and the drive rotating member to feed a tape;
a pause-operating lever having a cam portion for advancing or retiring the pinch rollers;
an interlocking lever on which said idler is mounted;
an L-shaped lever disposed between said pause-operating lever and said interlocking lever for interlocking said interlocking lever with said pause-operating lever;
a notch formed on said L-shaped lever and pins provided on opposite sides of said notch for adjusting a timing of contact between the idler and the pinch roller.

9. The apparatus of claim 1 which further comprises swingable means: a cassette receiving frame connected to said swingable means allowing a pivotal movement thereof relative to said swingable means; means for feeding the tape cassette loaded into said cassette receiving frame into a recording position through the action of the swingable means; manually operable record-operating means for carrying out a recording on the tape cassette fed into said recording position; locking means when operated into a given locking position for rendering said operating means inoperable; detecting means for contacting the cassette; said detecting means extending into the path of said tape cassette when in said recording position; and said locking means being operated to said locking position when said tape cassette has been modified to indicate a recording has been made thereon.

* * * * *